United States Patent
Umi et al.

(10) Patent No.: US 11,834,291 B2
(45) Date of Patent: Dec. 5, 2023

(54) MEDIUM CONVEYING APPARATUS FOR CHANGING TORQUE LIMIT VALUE OF TORQUE LIMITER

(71) Applicant: PFU LIMITED, Kahoku (JP)

(72) Inventors: Takayuki Umi, Kahoku (JP); Ryoichi Yasukawa, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/926,300

(22) Filed: Jul. 10, 2020

(65) Prior Publication Data

US 2021/0188576 A1    Jun. 24, 2021

(30) Foreign Application Priority Data

Dec. 19, 2019   (JP) ................................ 2019-229556

(51) Int. Cl.
*B65H 3/06*       (2006.01)
*G05D 17/02*     (2006.01)

(52) U.S. Cl.
CPC ........... *B65H 3/0669* (2013.01); *G05D 17/02* (2013.01); *B65H 2515/32* (2013.01)

(58) Field of Classification Search
CPC .. B65H 3/0669; B65H 3/0607; B65H 3/0684; B65H 2515/32; G05D 17/02
See application file for complete search history.

(56) References Cited

U.S. PATENT DOCUMENTS

| | | | | |
|---|---|---|---|---|
| 4,709,911 A | * | 12/1987 | Saiki | B65H 3/06 271/10.13 |
| 6,823,148 B2 | * | 11/2004 | Weaver | B65H 7/14 399/45 |
| 10,961,067 B2 | * | 3/2021 | Shuto | H04N 1/00628 |
| 2003/0160379 A1 | * | 8/2003 | Shimamura | B65H 3/5246 271/10.01 |
| 2013/0241145 A1 | | 9/2013 | Yasukawa | |
| 2019/0098157 A1 | * | 3/2019 | Nomoto | B65H 7/00 |
| 2019/0193967 A1 | * | 6/2019 | Shuto | H04N 1/00628 |
| 2020/0039779 A1 | * | 2/2020 | Barnes | B65H 31/02 |
| 2020/0055688 A1 | * | 2/2020 | Clayburn | B65H 31/10 |

FOREIGN PATENT DOCUMENTS

| | | | |
|---|---|---|---|
| JP | 4-4492 | * | 1/1992 |
| JP | 2019-116383 A | | 7/2019 |
| JP | 2013-193837 A | | 9/2019 |

OTHER PUBLICATIONS

Machine translation of JP4-4492. (Year: 1992).*

(Continued)

*Primary Examiner* — Thomas A Morrison
(74) *Attorney, Agent, or Firm* — LEWIS ROCA ROTHGERBER CHRISTIE LLP

(57) ABSTRACT

A medium conveying apparatus includes a medium tray, a feed roller to feed media placed on the medium tray in order from the lower side, a brake roller located to face the feed roller, a torque limiter to control a load applied to the brake roller, and a changing member to change a limit value of a torque of the torque limiter according to a height of the media placed on the medium tray.

6 Claims, 17 Drawing Sheets

(56) References Cited

OTHER PUBLICATIONS

Japanese Office Action dated Jul. 27, 2020 (dated Aug. 4, 2020) regarding Japanese Patent Application No. 2019-229556 corresponding to U.S. Appl. No. 16/926,300 (2 pages) with English Translation (4 pages).
Office Action dated Oct. 5, 2022 regarding U.S. Appl. No. 16/926,300 corresponding to U.S. Appl. No. 16/926,300 (18 pages).
Japanese Office Action dated Jul. 25, 2023 regarding Japanese Patent Application No. 2020-169405 corresponding to U.S. Appl. No. 16/926,300 (2 pages) with English Translation (4 pages).

\* cited by examiner

MEDIUM CONVEYING APPARATUS FOR CHANGING TORQUE LIMIT VALUE OF TORQUE LIMITER

CROSS-REFERENCE TO RELATED APPLICATIONS

This application is based upon and claims the benefit of priority of prior Japanese Patent Application No. 2019-229556, filed on Dec. 19, 2019, the entire contents of which are incorporated herein by reference.

TECHNICAL FIELD

Embodiments discussed in the present specification relate to medium conveyance.

BACKGROUND

In a medium conveying apparatus that feeds a medium using a feed roller and a brake roller, when the number of media placed on a medium tray is large, the frictional force between the media increases, and multi-feed of the media may occur. For example, the occurrence of multi-feed is suppressed by increasing the maximum torque applied to the brake roller, but when the maximum torque applied to the brake roller is increased, a jam of the medium tends to occur when thin paper, etc., is conveyed as a medium.

A medium supply apparatus including a separation force generating device to generate a rotational load on a brake roller in a direction opposite to the conveying direction, and capable of changing the rotational load of the brake roller by switching an electromagnetic clutch is disclosed (Japanese Unexamined Patent Publication (Kokai) No. 2013-193837).

A medium feeding device including a torque limiter to idle a separation roller in a first rotation direction when a rotational torque applied to the separation roller in the first rotation direction exceeds the limit torque which is a predetermined torque upper limit value, and capable of changing a separation setting is disclosed (Japanese Unexamined Patent Publication (Kokai) No. 2019-116383).

SUMMARY

According to some embodiments, a medium conveying apparatus includes a medium tray, a feed roller to feed media placed on the medium tray in order from the lower side, a brake roller located to face the feed roller, a torque limiter to control a load applied to the brake roller, and a changing member to change a limit value of a torque of the torque limiter according to a height of the media placed on the medium tray.

According to some embodiments, a medium conveying apparatus includes a medium tray, a feed roller to feed media placed on the medium tray in order from the lower side, a brake roller located to face the feed roller, a torque limiter to control a load applied to the brake roller, and a processor to change a limit value of a torque of the torque limiter according to a height of the media placed on the medium tray.

According to some embodiments, a method for controlling conveying a medium includes feeding media placed on a medium tray in order from the lower side, by a feed roller, a brake roller located to face the feed roller, controlling a load applied to a brake roller located to face the feed roller by a torque limiter, and changing a limit value of a torque of the torque limiter according to a height of the media placed on the medium tray.

According to some embodiments, a computer-readable, non-transitory medium stores a computer program. The computer program causes a medium conveying apparatus including a medium tray, a feed roller to feed media placed on the medium tray in order from the lower side, a brake roller located to face the feed roller, a torque limiter to control a load applied to the brake roller, to execute a process including changing a limit value of a torque of the torque limiter according to a height of the media placed on the medium tray.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
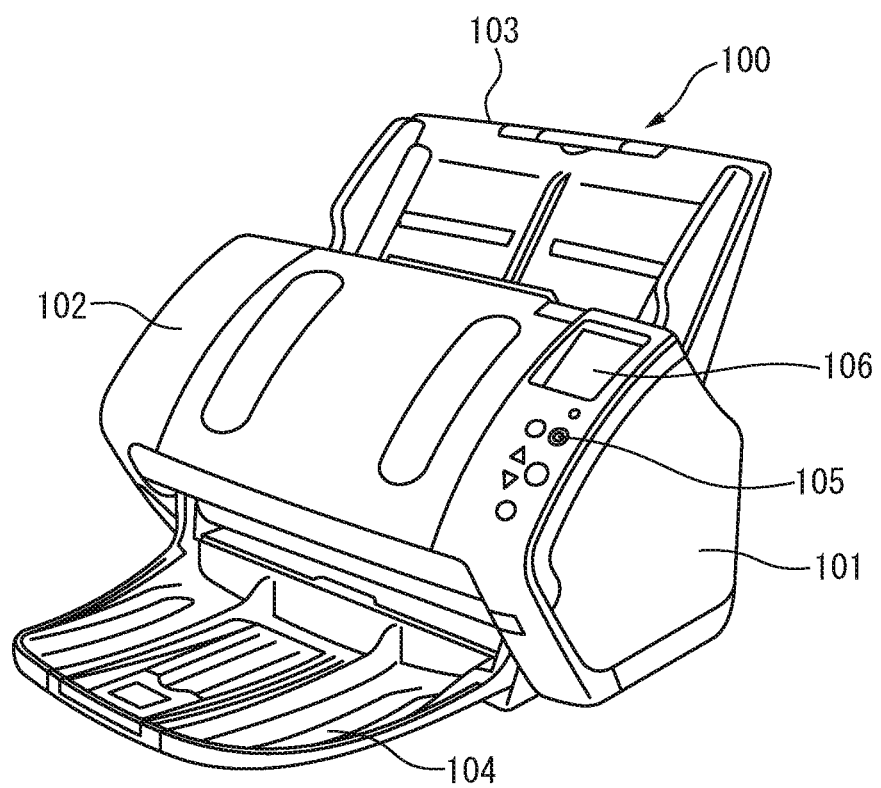
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thin paper, thick paper, a card, a brochure, a brochure, a passport, etc. The medium conveying apparatus 100 may be a fax machine, a copying machine, a multifunctional peripheral (MFP), etc. A conveyed medium may not be a document but may be an object being printed on etc., and the medium conveying apparatus 100 may be a printer etc.

The medium conveying apparatus 100 includes a lower housing 101, an upper housing 102, a medium tray 103, an ejection tray 104, an operation device 105, and a display device 106.

The upper housing 102 is located at a position covering the upper surface of the medium conveying apparatus 100 and is engaged with the lower housing 101 by hinges so as to be opened and closed at a time of medium jam, during cleaning the inside of the medium conveying apparatus 100, etc. The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
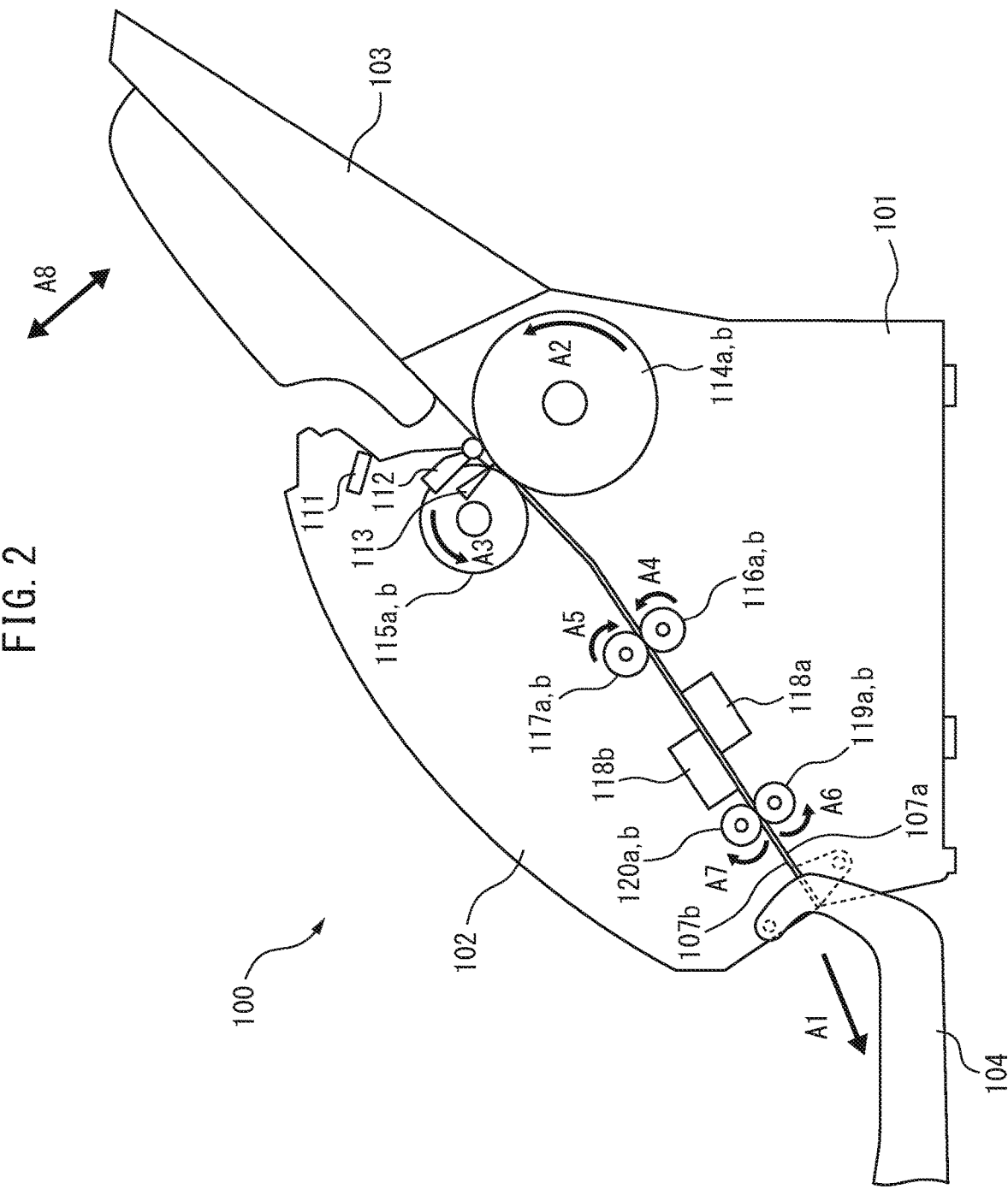
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a first sensor 111, a pick arm 112, a second sensor 113, a plurality of feed rollers 114a, 114b, a plurality of brake rollers 115a, 115b, a plurality of first conveyance rollers 116a, 116b, a plurality of second conveyance rollers 117a, 117b, a first imaging device 118a, a second imaging device 118b, a plurality of third conveyance rollers 119a, 119b and a plurality of fourth conveyance rollers 120a, 120b, etc.

The feed rollers 114a and 114b may be hereinafter collectively referred to as feed rollers 114. Further, the brake rollers 115a and 115b may be collectively referred to as brake rollers 115. The first conveyance rollers 116a and 116b may be collectively referred to as first conveyance rollers 116. The second conveyance rollers 117a and 117b may be collectively referred to as second conveyance rollers 117. Further, the first imaging device 118a and the second imaging device 118b may be collectively referred to as imaging devices 118. The third conveyance rollers 119a and 119b may be collectively referred to as third conveyance rollers 119. The fourth conveyance rollers 120a and 120b may be collectively referred to as fourth conveyance rollers 120.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first sensor 111 is provided on the upper housing 102, that is, above the conveyance path of the medium, and is located on the upstream side of the pick arm 112. The first sensor 111 is a sensor to detect a height of the media placed on the medium tray 103. The first sensor 111 is an infrared access distance sensor and measures a distance from an object existing at a facing position, based on a time difference between emission and reflection of infrared rays. The first sensor 111 includes a light emitter and a light receiver. The light emitter irradiates light (infrared light) toward the medium tray 103 or the lower housing 101. On the other hand, the light receiver receives the light emitted by the light emitter and reflected by the medium tray 103, the lower housing 101, or the medium placed on the medium tray 103, and generates and output an optical signal being an electric signal based on the received light. The optical signal indicates a time period from a time when the light emitter emits the light to a time when the light receiver receives the light. Since the time period from a time when the light emitter emits the light to a time when the light receiver receives the light changes according to the height of the media placed on the medium tray 103, the optical signal varies according to the height of the media placed on the medium tray 103. Therefore, the medium conveying apparatus 100 can detect the height of the media placed on the medium tray 103 based on the optical signal. The number of the first sensors 111 is not limited to one, and a plurality of the first sensors 111 may be located at intervals in the width direction perpendicular to the medium conveying direction A1. The first sensor 111 may be omitted.

The pick arm 112 is provided in the upper housing 102 and is located on the downstream side of the first sensor 111 and on the upstream side of the nip position of the feed roller 114 and the brake roller 115, particularly, at a position facing the feed roller 114 across the medium conveyance path. The pick arm 112 moves in the height direction A8 perpendicular to the lower guide 107a in accordance with control from a processing circuit described later, and urges (pushes) the medium placed on the medium tray 103 from above. The pick arm 112 separates from the feed roller 114 when the medium is not fed and abuts against the medium placed on the pedestal 103 to urge the medium from above when the medium is fed. Consequently, a moderate frictional force is generated between the feed rollers 114 and the medium, and the feed rollers 114 can satisfactorily feed the medium.

The second sensor 113 is located on the upstream side of the feed roller 114 and the brake roller 115. The second sensor 113 includes a contact detection sensor and detects whether or not a medium is placed on the medium tray 103. The second sensor 113 generates and outputs a medium signal changing the signal value between a state in which a medium is placed on the medium tray 103 and a state in which a medium is not placed.

The feed rollers 114 are provided on the lower housing 101 and feed media placed on the medium tray 103 in order from the lower side. The brake rollers 115 are provided on the upper housing 102 and each of the plurality of brake rollers 113 is located to face a corresponding one of the feed rollers 114.

The first imaging device 118a includes a line sensor based on a unity-magnification optical system type contact image sensor (CIS) including an imaging element based on a complementary metal oxide semiconductor (CMOS) linearly located in a main scanning direction. Further, the first imaging device 118a includes a lens for forming an image on the imaging element, and an A/D converter for amplifying and analog-digital (A/D) converting an electric signal output from the imaging element. The first imaging device 118a generates and outputs an input image imaging a front side of a conveyed medium, in accordance with control from a processing circuit to be described later.

Similarly, the second imaging device 118b includes a line sensor based on a unity-magnification optical system type CIS including an imaging element based on a CMOS linearly located in a main scanning direction. Further, the second imaging device 118*b* includes a lens for forming an image on the imaging element, and an A/D converter for amplifying and A/D converting an electric signal output from the imaging element. The second imaging device 118*b* generates and outputs an input image imaging a back side of a conveyed medium, in accordance with control from a processing circuit to be described later.

Only either of the first imaging device 118*a* and the second imaging device 118*b* may be located in the medium conveying apparatus 100 and only one surface of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs. The first imaging device 118*a* and the second imaging device 118*b* may be collectively referred to as imaging devices 118.

A medium placed on the medium tray 103 is conveyed between the lower guide 107*a* and the upper guide 107*b* in the medium conveying direction A1 by the feed rollers 114 rotating in a direction of an arrow A2 in FIG. 2, that is, a medium feeding direction. When a medium is conveyed, the brake rollers 115 rotate in a direction of an arrow A3, that is, a direction opposite to the medium feeding direction. By the workings of the feed rollers 114 and the brake rollers 115, when a plurality of media are placed on the medium tray 103, only a medium in contact with the feed rollers 114, out of the media placed on the medium tray 103, is separated. Consequently, the medium conveying apparatus 100 operates in such a way that conveyance of a medium other than the separated medium is restricted (prevention of multi-feed).

The medium is fed between the first conveyance rollers 113 and the second conveyance rollers 114 while being guided by the lower guide 107*a* and the upper guide 107*b*. The medium is fed between the first imaging device 118*a* and the second imaging device 118*b* by the first conveyance rollers 116 and the second conveyance rollers 117 rotating in directions of an arrow A4 and an arrow A5, respectively. The medium read by the imaging devices 118 is ejected on the ejection tray 104 by the third conveyance roller 119 and the fourth conveyance roller 120 rotating in directions of an arrow A6 and an arrow A7, respectively.

Figure 3:
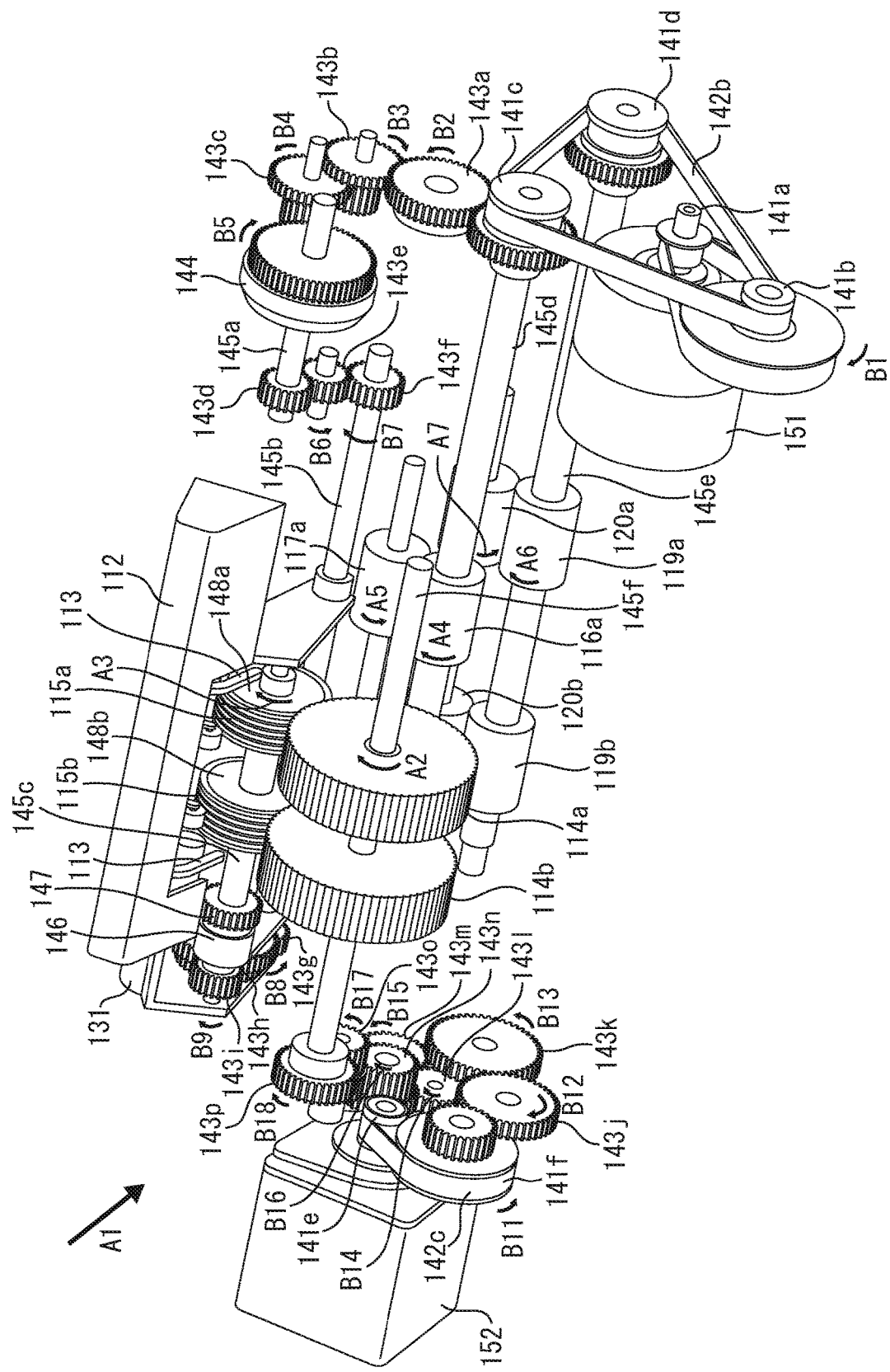
FIG. 3 is a schematic diagram for illustrating a driving mechanism of each roller.
Figure 4:
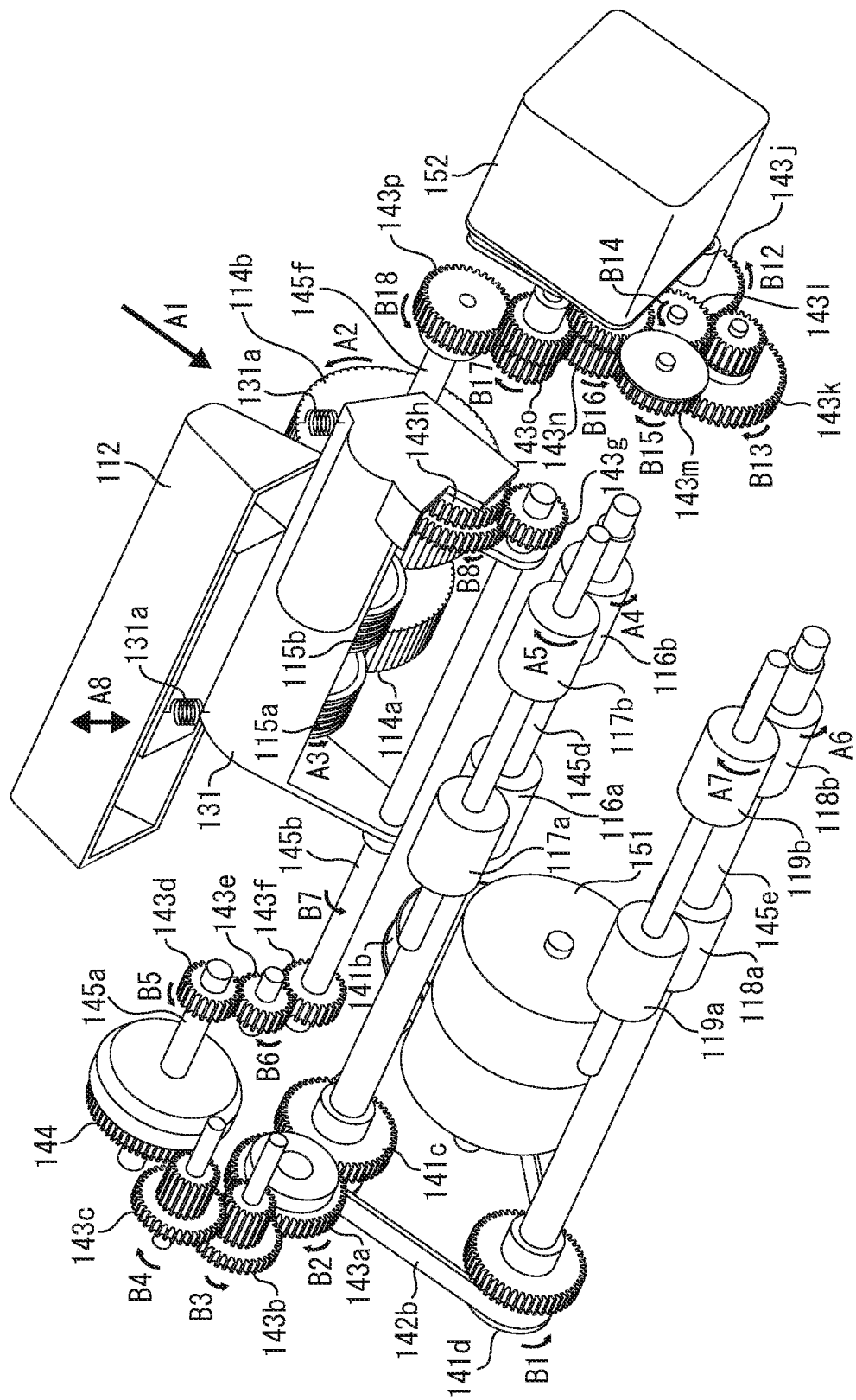
FIG. 4 is a schematic diagram for illustrating a driving mechanism of each roller.

FIGS. 3 and 4 are schematic views for illustrating a driving mechanism of the feed roller 114, the brake roller 115, the first conveyance roller 116, and the third conveyance roller 119. FIG. 3 is a perspective view of the driving mechanism of each roller from the upstream side, and FIG. 4 is a perspective view of the driving mechanism of each roller from the above and downstream side.

As shown in FIGS. 3 and 4, the driving mechanisms of the brake rollers 115, the first conveyance rollers 116, and the third conveyance rollers 119 include a first motor 151, first to fourth pulleys 141*a* to 141*d*, first to second belts 142*a* to 142*b*, first to ninth gears 143*a* to 143*i*, an electromagnetic clutch 144, first to fifth shafts 145*a* to 145*e*, a first torque limiters 146, a ratchet gear 147, and second torque limiters 148*a* to 148*b*. On the other hand, the driving mechanism of the feed rollers 114 has a second motor 152, fifth to sixth pulley 141*e* to 141*f*, a third belt 142*c*, tenth to sixteenth gears 143*j* to 143*p* and a sixth shaft 145*f*, etc.

The first motor 151 generates a driving force for rotating the brake roller 115, the first conveyance rollers 116, and the third conveyance rollers 119 by a control signal from a processing circuit to be described later. The first motor 151 generates a first driving force for rotating the brake roller 115 in a direction A3 opposite to the medium feeding direction and rotating the first conveyance rollers 116 and the third conveyance rollers 119 in the medium conveying directions A4 and A6. The first motor 151 may further rotate the second conveyance rollers 117 and the fourth conveyance rollers 120 in the medium conveying directions A5 and A7 by the first driving force. Also, some or all of the first to fourth conveyance rollers 116, 117, 119, and 120 may be rotated by the driving force generated by the second motor 152 or other motor.

The first pulley 141*a* is attached to a rotation shaft of the first motor 151, and the first belt 142*a* is stretched between the first pulley 141*a* and a pulley portion having a larger outer diameter of the second pulley 141*b*. The second belt 142*b* is stretched between the pulley portion having the smaller outer diameter of the second pulley 141*b*, a pulley portion of the third pulley 141*c*, and a pulley portion of the fourth pulley 141*d*.

A gear portion of the third pulley 141*c* is engaged with the first gear 143*a*. The first gear 143*a* is engaged with the second gear 143*b*, the second gear 143*b* is engaged with the third gear 143*c*, and the third gear 143*c* is engaged with the electromagnetic clutch 144. The electromagnetic clutch 144 is attached to the first shaft 145*a*, and the fourth gear 143*d* is further attached to the first shaft 145*a*. The fourth gear 143*d* is engaged with the fifth gear 143*e*, and the fifth gear 143*e* is engaged with the sixth gear 143*f* The sixth gear 143*f* is attached to the second shaft 145*b*, and the seventh gear 143*g* is further attached to the second shaft 145*b*. The seventh gear 143*g* is engaged with the eighth gear 143*h*, and the eighth gear 143*h* is engaged with the ninth gear 143*i*. The ninth gear 143*i* is attached to the third shaft 145*c*, and the brake rollers 115*a* and 115*b* are further attached to the third shaft 145*c* via the first torque limiter 146, the ratchet gear 147, and the second torque limiters 148*a* and 148*b*.

The electromagnetic clutch 144 is a clutch in which the limit value of the torque can be electromagnetically changed according to a control signal from a processing circuit to be described later, and transmits a driving force from the first motor 151 to the brake roller 115. The electromagnetic clutch 144 is, for example, a micro powder clutch. The electromagnetic clutch 144 may be another type of clutch, such as a hysteresis clutch. In the present embodiment, the limit value of the torque of the electromagnetic clutch 144 is always set to a sufficiently high value (a value higher than the limit value of the first torque limiter 146 and the second torque limiters 148*a* to 148*b*) by the control signal from the processing circuit.

The 7th to 9th gears 143*g* to 143*i* is an example of a transmission member to transmit the drive force occurred by the first motor 151 to the first torque limiter 146. The transmission member may include the first to fourth pulleys 141*a* to 141*d*, the first to second belts 142*a* to 142*b*, the first to sixth gears 143*a* to 143*f*, and the first to fifth shafts 145*a* to 145*e*. The transmission member may be composed of only gears or only pulleys and belts.

The third pulley 141*c* is attached to the fourth shaft 145*d*, and the first conveyance rollers 116 are further attached to the fourth shaft 145*d*. The fourth pulley 141*d* is attached to the fifth shaft 145*e*, and the third conveyance rollers 119 are further attached to the fifth shaft 145*e*.

The second motor 152 generates a driving force for rotating the feed roller 114 by a control signal from the processing circuit to be described later. The second motor 152 generates a second driving force for rotating the feed roller 114 in the medium feeding direction A2.

The fifth pulley 141e is attached to a rotation shaft of the second motor 152, and a third belt 142c is stretched between the fifth pulley 141e and a pulley portion of the sixth pulley 141f. A gear portion of the sixth pulley 141f is engaged with the tenth gear 143j, the tenth gear 143j is engaged with the eleventh gear 143k, the eleventh gear 143k is engaged with the twelfth gear 143l, and the twelfth gear 143l is engaged with the thirteenth gear 143m. The thirteenth gear 143m is engaged with the fourteenth gear 143n, the fourteenth gear 143n is engaged with the fifteenth gear 143o, and the fifteenth gear 143o is engaged with the sixteenth gear 143p. The sixteenth gear 143p is attached to the sixth shaft 145f, and the feed rollers 114 are further attached to the sixth shaft 145f.

The medium conveying apparatus 100 also further includes a support member 131. One end of the spring 131a is supported by the upper housing 102, and the other end of the spring 131a is attached to an upper surface of the support member 131. The support member 131 and the brake rollers 115 are urged by the spring 131a downward in the height direction A8, that is, toward the feed rollers 114. The spring 131a is an example of a pressing member to press the brake rollers 115 toward the feed rollers 114. Instead of the spring 131a, rubber, etc., may be used as the pressing member.

Hereinafter, the operations of each roller and the driving mechanism of each roller will be described.

When the first motor 151 generates the first driving force, the first pulley 141a rotates in the direction of the arrow B1, and the second to fourth pulleys 141b to 141d accordingly rotate in the direction of the arrow B1, respectively. Also, the first to third gears 143a to 143c and electromagnetic clutch 144 rotate in the direction of the arrows B2 to B5, the fourth to sixth gears 143d to 143f rotate in the direction of the arrows B5 to B7, and the seventh to ninth gears 143g to 143i rotate in the direction of the arrows B7 to B9, respectively. As a result, the brake rollers 115 are rotated in the direction A3 opposite to the medium feeding direction by the first driving force from the first motor 151.

Further, the first conveyance rollers 116 rotate in the medium conveying direction A4, by the third pulley 141c rotating in the direction of the arrow B1. The third conveyance rollers 119 rotate in the medium conveying direction A6, by the fourth pulley 141d rotating in the direction of the arrow B1.

On the other hand, when the second motor 152 generates the second driving force, the fifth pulley 141e rotates in the direction of the arrow B11, and the sixth pulley 141f and the tenth gear 143j accordingly rotate in the direction of the arrows B1 land B12, respectively. In addition, the feed rollers 114 rotate in the medium feeding direction A2, by the eleventh to sixteenth gears 143k to 143p rotating in the directions of the arrows B13 to B18, respectively.

Figure 5:
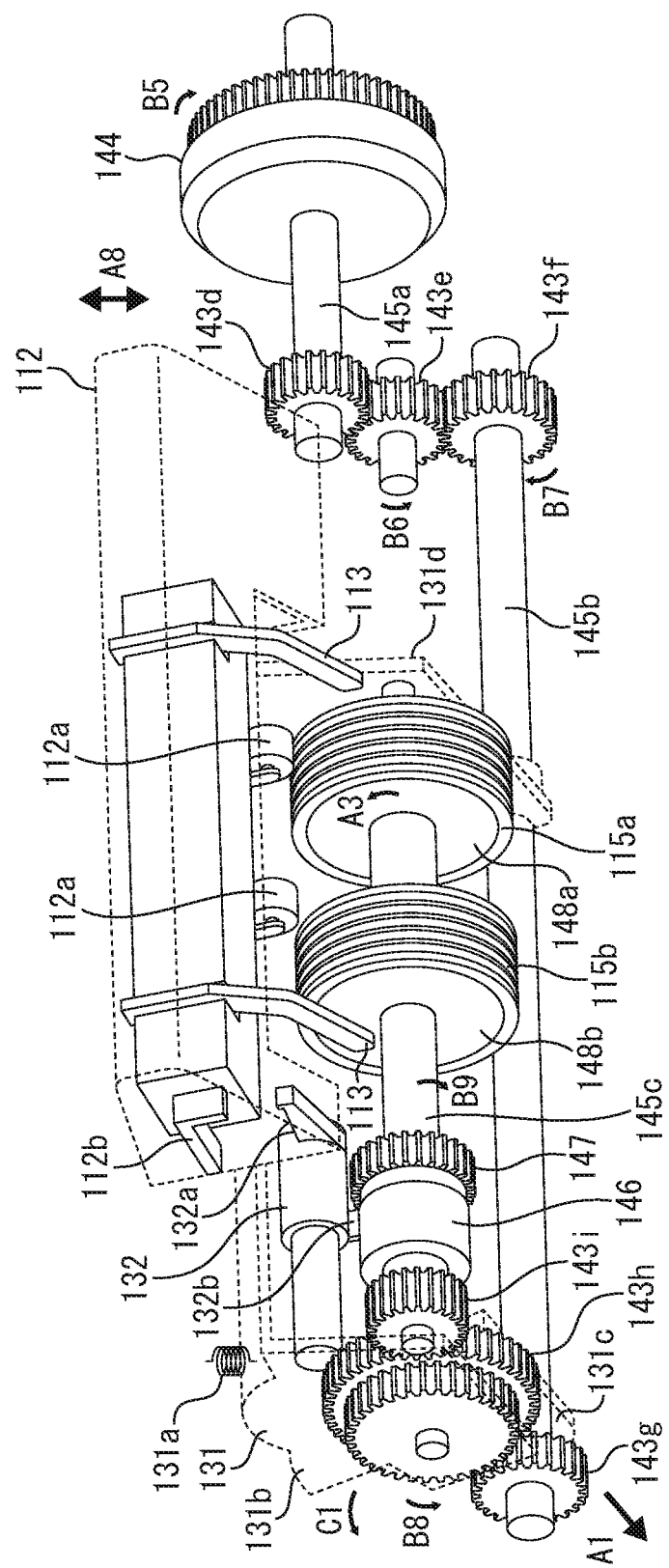
FIG. 5 is a schematic diagram for illustrating a pick arm 112, etc.

FIG. 5 is a schematic diagram for illustrating the pick arm 112 and the support member 131. FIG. 5 is a perspective view of a drive mechanism of the pick arm 112, the support member 131, and the brake rollers 115 from the upstream side. In FIG. 5, pick arm 112 and support member 131 are shown in dotted lines.

As shown in FIG. 5, the medium conveying apparatus 100 further includes a stopper 132.

The pick arm 112 has rollers 112a and an abutting portion 112b.

Each of the rollers 112a is provided at a position facing each of the feed rollers 114 across the medium conveyance path. Each of the rollers 112a separates from the feed rollers 114 when the medium is not fed, and abuts on the medium placed on the medium tray 103 when the medium is fed.

The abutting portion 112b is provided at a position facing the stopper 132. The abutting portion 112b moves in conjunction with the movement of the pick arm 112 (the rollers 112a) in the height direction A8. The abutting portion 112b separates from the stopper 132 when the roller 112a is located at a position exceeding a predetermined height (e.g., 4 mm from a mounting surface of the medium tray 103) in the height direction A8. When the rollers 112a are located at a position equal to or less than a predetermined height in the height direction A8, the abutting portion 112b abuts against the stopper 132 to rotate (swing) the stopper 132.

The stopper 132 is rotatably (swingably) supported with the support member 131. The stopper 132 has an abutted portion 132a and a locking portion 132b.

The abutted portion 132a is provided at a position facing the abutting portion 112b of the pick arm 112. A force in which the abutted portion 132a is directed upward in the height direction A8 by a torsion coil spring (not shown), is applied to the stopper 132. When the roller 112a is located at a position exceeding a predetermined height in the height direction A8, the abutted portion 132a separates from the abutting portion 112b and located upward by the force of the torsion coil spring. On the other hand, when the roller 112a is located at a position less than the predetermined height in the height direction A8, the abutting portion 132a is pressed downward by the abutting portion 112b with a force larger than the force of the torsion coil spring, and is located downward.

The locking portion 132b is provided at a position facing the ratchet gear 147. When the abutted portion 132a is apart from the abutting portion 112b, the locking portion 132b abuts against the ratchet gear 147 to lock the ratchet gear 147. On the other hand, the locking portion 132b separates from the ratchet gear 147 when the abutted portion 132a abuts against the abutting portion 112b and is located downward by the abutting portion 112b.

When the ratchet gear 147 is locked by the locking portion 132b, the ratchet gear 147 is configured to be rotatable only in the direction A3 opposite to the medium feeding direction, and not to rotate the medium feeding direction (a direction opposite to the arrow A3).

The support member 131 is a member made of resin or metal, etc., and has a first to third side surfaces 131b to 131d. The support member 131 supports the brake rollers 115, the seventh to ninth gears 143g to 143i, the first torque limiter 146, the ratchet gear 147, and the second torque limiters 148a to 148b by the first to third side surfaces 131b to 131d. The second side surface 131c and the third side surface 131d are attached to the second shaft 145b rotatably (swingably) with the second shaft 145b as a rotation (swing) axis, respectively. The first side surface 13ib rotates (swings) in conjunction with the rotation (swing) of the second side surface 131c and the third side surface 131d. Both ends of the third shaft 145c are attached to the first side surface 131b and the third side surface 131d. Thus, the support member 131 is provided to be rotatable (swing) about the second shaft 145b, and swingably supports the brake roller 115.

Figure 6:
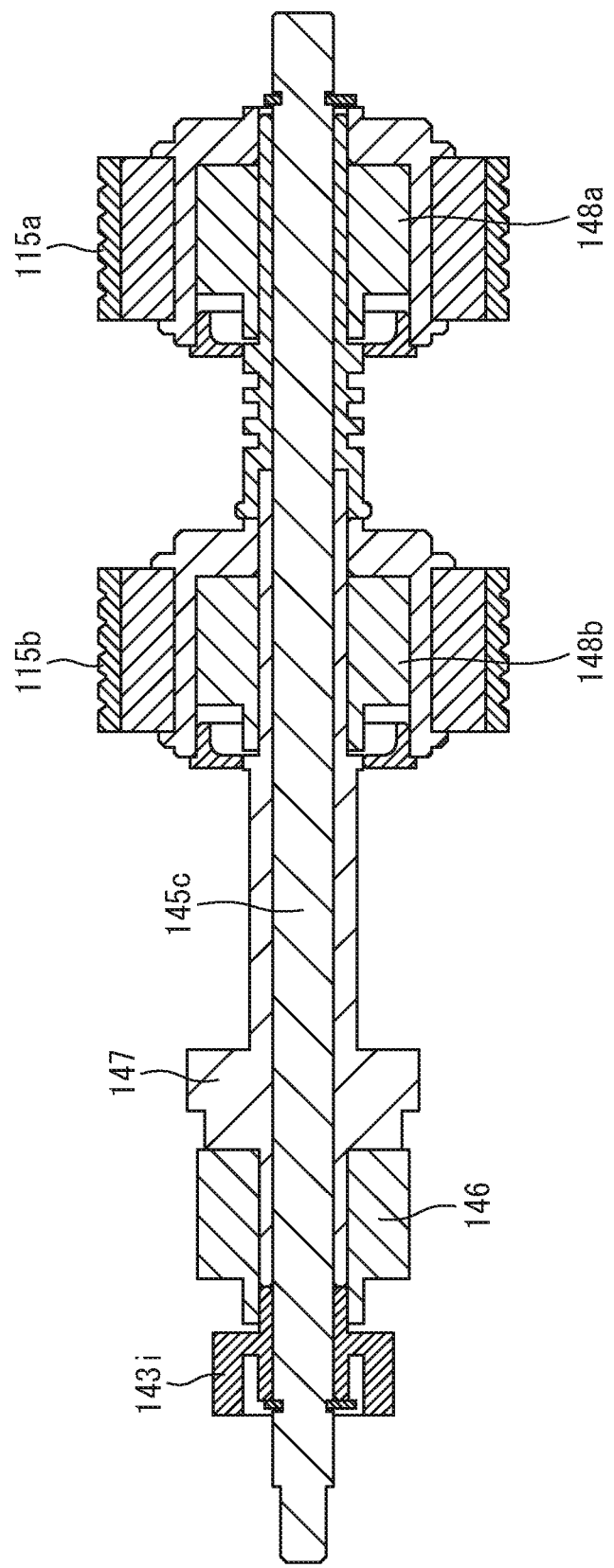
FIG. 6 is a schematic diagram for illustrating each torque limiter.

FIG. 6 is a schematic diagram for illustrating the first torque limiter 146 and the second torque limiters 148a to 148b. FIG. 6 is a cross-sectional view of the third shaft 145c provided with the brake rollers 115, the ninth gear 143i, the first torque limiter 146, the ratchet gear 147, and the second torque limiters 148a to 148b.

The first torque limiter 146 and the second torque limiters 148a to 148b are an example of a torque limiter, which controls the load applied to the brake rollers 115. As shown in FIG. 6, the first torque limiter 146 and the second torque limiters 148a to 148b are located on a transmission path of the driving force from the first motor 151 to the brake rollers 115. Specifically, the first torque limiter 146 and the second torque limiters 148a to 148b are located on the third shaft 145c which is a rotational axis of the brake rollers 115. Since there is no gear row between each torque limiter and the brake rollers 115, it is suppressed that the separation force applied to the brake rollers 115 fluctuates due to manufacturing error, etc., for each part. Consequently, the medium conveying apparatus 100 can separate a medium with high precision regardless of a manufacturing error for each part. The first torque limiter 146 and the second torque limiters 148a to 148b may not necessarily be located on the coaxial axis. The first torque limiter 146 may be, for example, located on the second shaft 145b.

The first torque limiter 146, the ratchet gear 147, the second torque limiters 148a to 148b, the brake rollers 115 and the third shart145c may be hereinafter collectively referred to as a brake unit.

The first torque limiter 146 is located on the transmission path of the driving force from the seventh to ninth gears 143g to 143i to the second torque limiters 148a to 148b. The limit value of the torque of the first torque limiter 146 is a first limit value. A ratchet gear 147 is located on the transmission path of the driving force from the first torque limiter 146 to the second torque limiters 148a to 148b.

The second torque limiters 148a to 148b are located on the transmission path of the driving force from the first torque limiter 146a to the brake rollers 115. The second torque limiters 148a and 148b are provided separately between the third shaft 145c and the respective brake rollers 115a and 115b. In other words, the second torque limiters 148a and 148b are provided corresponding to the brake rollers 115a and 115b, respectively. The limit value of the torque of each second torque limiter 148a, 148b is less than the first limit value, and the sum of the limit values of the torque of the second torque limiters 148a, 148b is equal to a second limit value greater than the first limit value. For example, the first limit value is set to 500 gf·cm, the second limit value is set to 700 gf·cm, and the limit value of the torque of each of the second torque limiters 148a and 148b is set to 350 gf·cm. A common second torque limiter may be provided for the brake rollers 115a and 115b instead of separate second torque limiters 148a and 148b being provided for the brake rollers 115a and 115b, respectively.

The first limit value is set to a value by which a turning force through the first torque limiter 146 is cut off when there is one medium, and a turning force through the first torque limiter 146 is transmitted when there are a plurality of media. Similarly, the second limit value is set to a value by which a turning force through the second torque limiters 148a, 148b is cut off when there is one medium, and a turning force through the second torque limiters 148a, 148b is transmitted when there are a plurality of media. Consequently, when only one medium is conveyed, the brake rollers 115 do not rotate according to the first driving force and are driven by the feed rollers 114. On the other hand, when a plurality of media are conveyed, the brake rollers 115 prevents occurrence of media multi-feed by rotating in the direction A3 opposite to the medium feeding direction and separating a medium in contact with the feed rollers 114 from the other media. At this time, the outer peripheral surfaces of the brake rollers 115 may be apply a force in the direction A3 opposite to the medium feeding direction to the media in a state in which the outer peripheral surfaces are not rotating in the direction A3 opposite to the medium feeding direction and are stopped.

Figure 7:
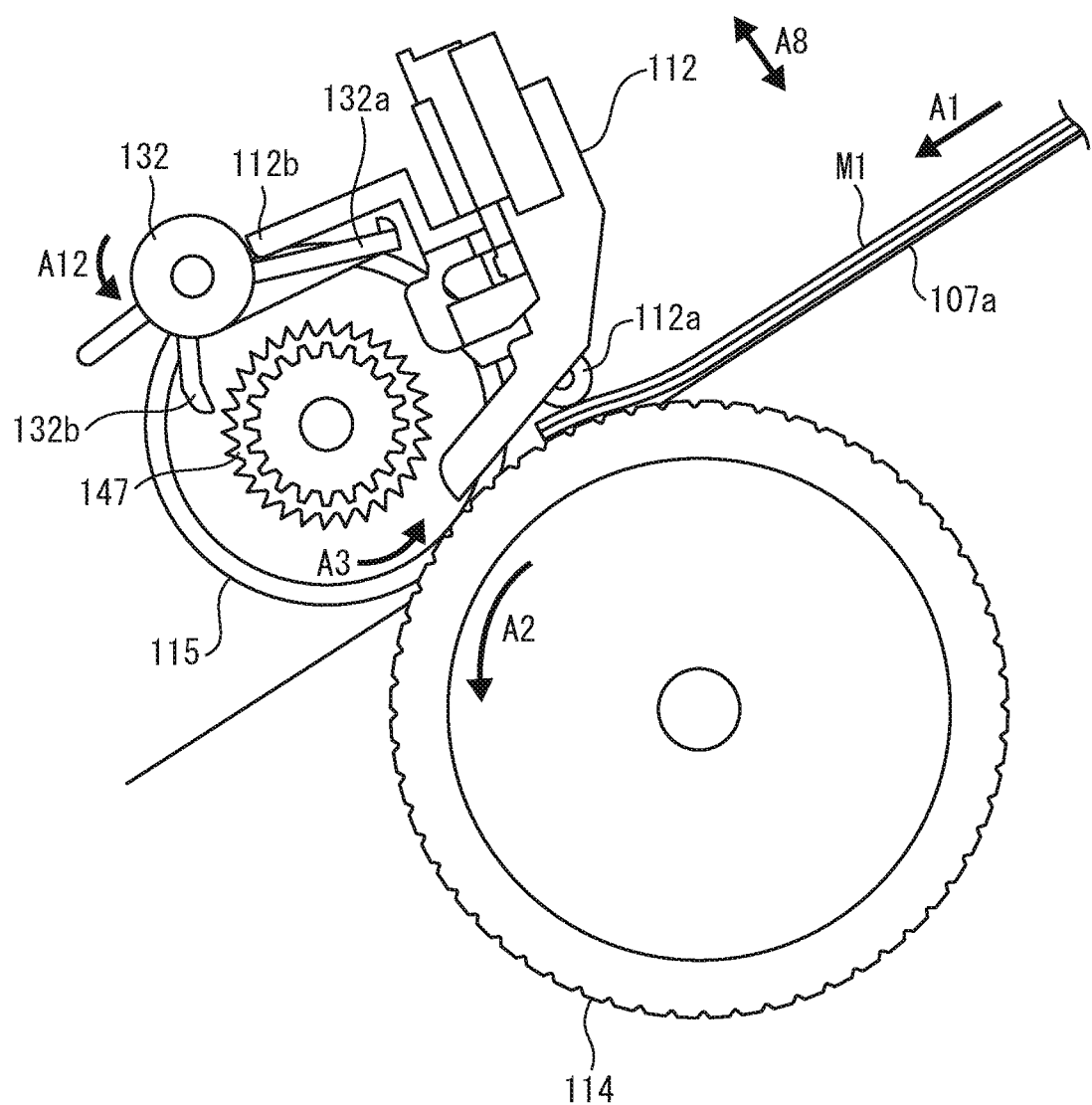
FIG. 7 is a schematic diagram for illustrating the operations of the pick an 112, etc.
Figure 8:
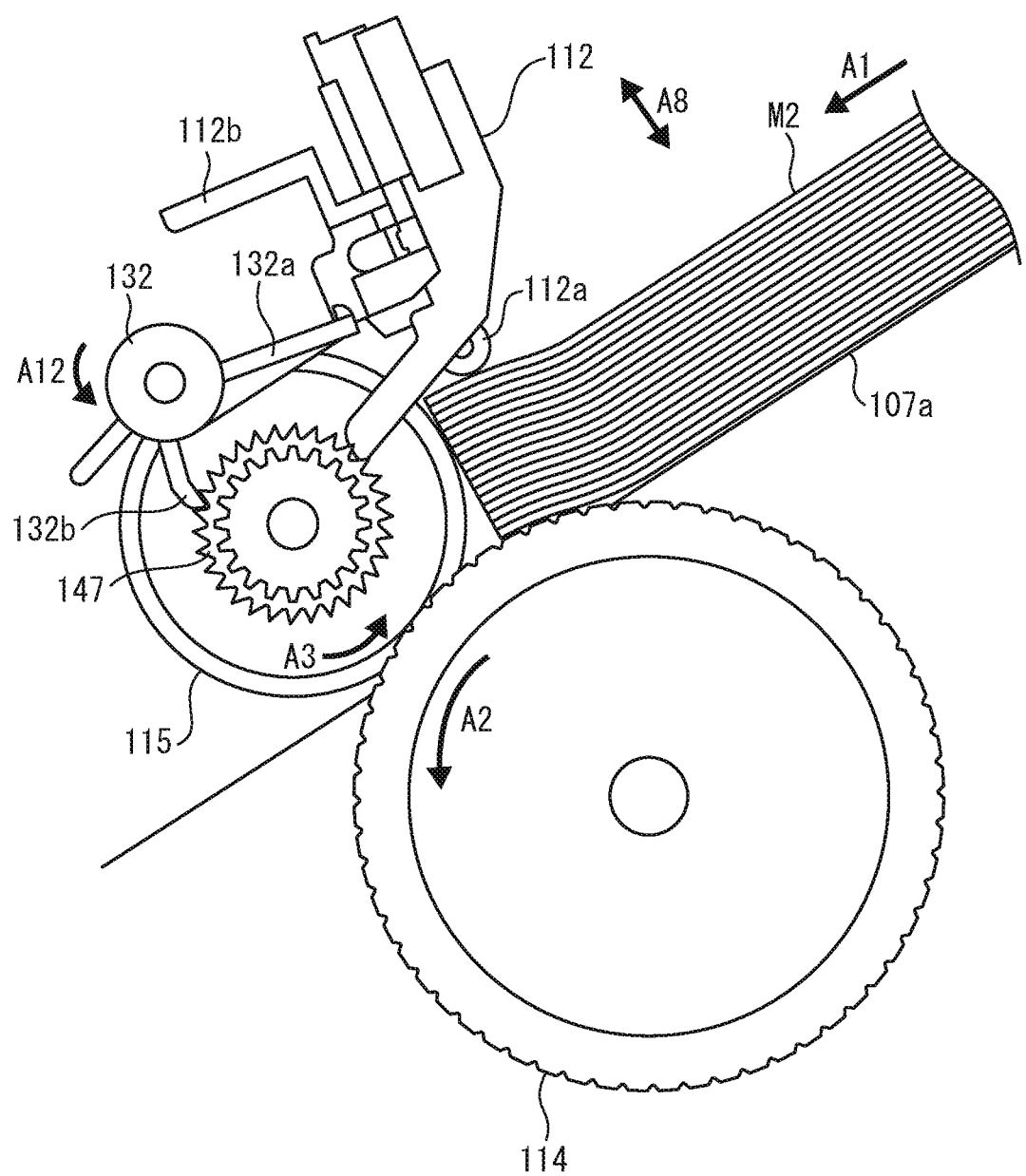
FIG. 8 is a schematic diagram for illustrating the operations of the pick arm 112, etc.

FIGS. 7 and 8 are schematic views for illustrating the operations of the pick arm 112, the stopper 132 and the brake roller 115. FIGS. 7 and 8 show a state in which the pick arm 112 moves downward in the height direction A8 in accordance with the control of the processing circuit and presses the medium placed on the medium tray 103 from above. FIG. 7 shows a state in which the height of the media M1 placed on the medium tray 103 is equal to or lower than a predetermined height, and FIG. 8 shows a state in which the height of the media M2 placed on the medium tray 103 exceeds a predetermined height.

As shown in FIG. 7, when the height of the media M1 placed on the medium tray 103 is equal to or less than a predetermined height, the roller 112a of the pick arm 112 abutting the uppermost surface of the media M1 is located downward in the height direction A8. As a result, the abutting portion 112b abuts the abutted portion 132a of the stopper 132 and pushes the abutted portion 132a downward. As a result, the locking portion 132b separates from the ratchet gear 147, and the rotation of the ratchet gear 147 is not limited. In this state, when the first motor 151 and the second motor 152 generate the first driving force and the second driving force, the first driving force is transmitted to the brake rollers 115 via the first torque limiter 146 and the second torque limiters 148a and 148b. However, the limit value (first limit value) of the torque of the first torque limiter 146 is smaller than the sum (second limit value) of the limit values of the torques of the second torque limiters 148a and 148b. Therefore, the limit value of the torque of the entire torque limiters is the first limit value which is the limit value of the torque of the first torque limiter 146.

On the other hand, as shown in FIG. 8, when the height of the media M2 placed on the medium tray 103 exceeds a predetermined height, the roller 112a of the pick arm 112 abutting the uppermost surface of the media M2 is located upward in the height direction A8. As a result, the abutting portion 112b separates from the abutted portion 132a of the stopper 132, and the abutting portion 132a is located upward by the force applied by the torsion coil spring. As a result, the locking portion 132b abuts the ratchet gear 147, and locks the ratchet gear 147. The ratchet gear 147 locked by the locking portion 132b can rotate only in the direction A3 opposite to the medium feeding direction, and cannot rotate in the medium feeding direction (the direction opposite to the arrow A3). In this state, when the first motor 151 and the second motor 152 generate the first driving force and the second driving force, the first driving force is transmitted to the brake rollers 115 via the second torque limiters 148a and 148b. However, the force for causing the brake roller 115 to be driven and rotated in the medium feeding direction (the direction opposite to the arrow A3) by the feed roller 114 rotating in the medium feeding direction A2 by the second driving force is interrupted by the ratchet gear 147 and is not transmitted to the first torque limiter 146. Therefore, the limit value of the torque of the entire torque limiters becomes the second limit value which is the limit value of the torque of the second torque limiters 148a and 148b.

Thus, the stopper 132 functions as a regulating member to prevent the force for rotating the brake rollers 115 by the feed rollers 114 in the medium feeding direction from being transmitted to the first torque limiter 146.

The pick arm 112 functions as a setting member to set a torque limiter that defines the maximum torque applied to the brake roller 115 to the first torque limiter 146 or the second torque limiters 148a, 148b. In particular, the pick arm 112 uses the stopper 132 to set whether or not a force for rotating the brake roller 115 by the feed roller 114 in the medium feeding direction is transmitted to the first torque limiter 146. The pick arm 112 sets the torque limiter that defines the maximum torque applied to the brake rollers 115 to the first torque limiter 146, by setting so that the force is transmitted to the first torque limiter 146. On the other hand, the pick arm 112 sets the torque limiter that defines the maximum torque applied to the brake rollers 115 to the second torque limiters 148a and 148b by setting the force not to be transmitted to the first torque limiter 146.

In other words, the pick arm 112 functions as a changing member to change the limit value of the torque of the torque limiter to the first limit value or the second limit value. In particular, the pick arm 112 uses the stopper 132 to change whether or not a force for rotating the brake rollers 115 by the feed rollers 114 in the medium feed direction is transmitted to the first torque limiter 146.

By using the pick arm 112 and the stopper 132, the medium conveying apparatus 100 can change the maximum torque applied to the brake rollers 115 with a simple structure, thereby reducing the device size and equipment cost.

Further, the pick arm 112 sets the torque limiter that defines the maximum torque applied to the brake roller 115 to the first torque limiter 146 or the second torque limiters 148a, 148b, in accordance with the height of the media placed on the medium tray 103. In other words, the pick arm 112 changes the limit value of the torque of the torque limiter according to the height of the media placed on the medium tray 103. The higher the height of the media placed on the pedestal 103, the greater the weight of the medium placed on the medium to be fed and the greater the frictional force between the medium to be fed and the medium placed thereon. In the so-called bottom-first type medium conveying apparatus 100 in which the media placed on the medium tray 103 are fed in order from the lower side, the greater the frictional force between the medium to be fed and the medium placed thereon, the more likely the media are multi-fed. The medium conveying apparatus 100 increases the maximum torque applied to the brake rollers 115 when the height of the media placed on the medium tray 103 exceeds a predetermined height than the maximum torque applied to the brake rollers 115 when the height of the media placed on the medium tray 103 is equal to or less than the predetermined height. Thus, the medium conveying apparatus 100 can suppress the occurrence of multi-feed of the medium.

Conversely, the medium conveying apparatus 100 decreases the maximum torque applied to the brake rollers 115 when the height of the media placed on the medium tray 103 is equal to or lower than the predetermined height than the maximum torque applied to the brake rollers 115 when the height of the media placed on the medium tray 103 exceeds the predetermined height. Thus, the medium conveying apparatus 100 can suppress the occurrence of a jam in the medium when thin paper, etc., is conveyed as a medium. Accordingly, when only one medium exists between the brake rollers 115 and the feed rollers 114, the brake rollers 115 are easily driven to the feed rollers 114, and it is suppressed that slip occurs between the brake rollers 115 and the medium. Therefore, the medium conveying apparatus 100 can suppress the shortening of the component life of the brake rollers 115.

Further, the pick arm 112 urges the medium placed on the medium tray 103 from above, and changes the limit value of the torque of the torque limiter, in accordance with the height at which the pick arm 112 is located. Therefore, the medium conveying apparatus 100 can automatically change the limit value of the torque limiter in conjunction with the height of the media placed on the medium tray 103. The medium conveying apparatus 100 can appropriately change the maximum torque applied to the brake rollers 115 without changing it by the user, thereby improving the convenience of the user.

Figure 9:
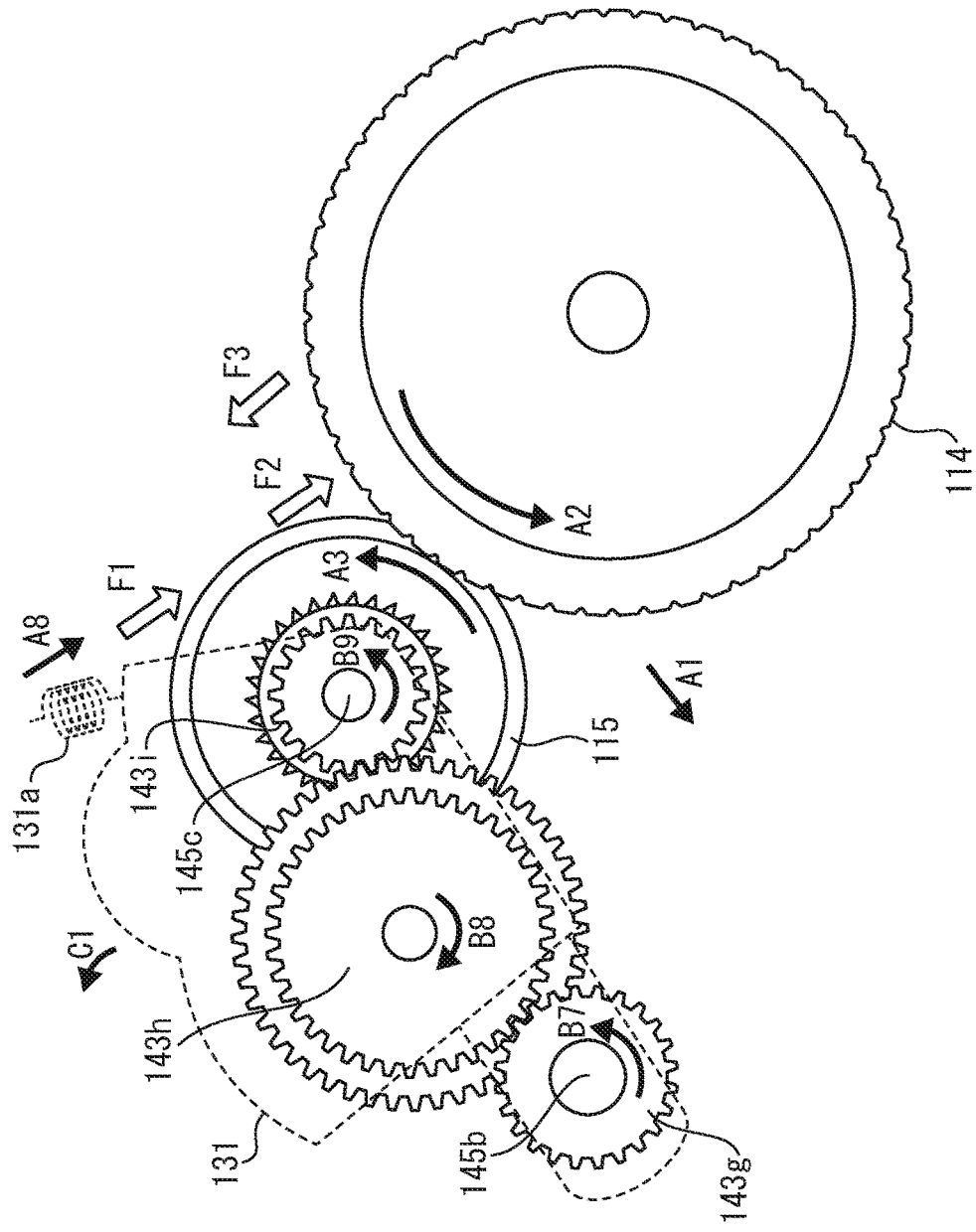
FIG. 9 is a schematic diagram for illustrating the operations of the brake roller 115, etc.

FIG. 9 is a schematic diagram for illustrating the operations of the seventh to ninth gears 143g to 143i, the support member 131 and the brake rollers 115.

As described above, when the first motor 151 generates the first driving force, the seventh to ninth gears 143g to 143i rotate in the direction of the arrows B7 to B9, respectively, and the brake rollers 115 rotates in the direction A3 opposite to the medium feeding direction. The gear group including the seventh to ninth gears 143g to 143i and the brake rollers 115 is supported by a support member 131 which is rotatably (swingably) provided about the second shaft 145b to which the seventh gear 143g is attached. Therefore, a force directed in the direction of the arrow C1 is applied to the eighth gear 143h, by the seventh gear 143g rotating in the direction of the arrow B7. As a result, a force for rotating about the second shaft 145b in the direction of the arrow C1 is applied to the first side surface 131b to which the eighth gear 143h is attached. As a result, a force for rotating in the direction of arrow C1 about the second shaft 145b is applied to the support member 131, and a force in a direction (direction of arrow C1) away from the feed rollers 114 is applied to the brake rollers 115.

The number of gears located between the second shaft 145b serving as the swinging shaft of the brake rollers 115 and the third shaft 145c serving as the rotating shaft of the brake rollers 115 is not limited to three, and may be any odd number of three or more. As a result, while the brake rollers 115 rotate in the same direction A3 as the rotation direction B7 of the seventh gear 143g, a force directed in the same direction C1 as the rotation direction B7 of the seventh gear 143g is applied to the brake rollers 115. Thus, the brake roller unit is swingably supported with respect to the second shaft 145b so that a predetermined force acts on the brake roller 115 in a direction away from the feed rollers 114 when the first driving force is transmitted from the seventh to ninth gears 143g to 143i.

The support member 131 and the brake rollers 115 are pressed by a spring 13a toward the feed roller 114. Thus, the brake rollers 115 can feed the medium without separating from the feed rollers 114.

Hereinafter, the force acting on the brake rollers 115 will be described.

As shown in FIG. 9, the first to third forces F1 to F3 act on the brake rollers 115. The first force F1 is a pressing force by which the spring 131a presses the brake rollers 115 toward the feed rollers 114 side. The first force F1 is a static force determined according to the spring constant, etc., of the spring 131a, and does not change regardless of whether the torque limiter that defines the maximum torque applied to the brake rollers 115 is the first torque limiter 146 or the second torque limiters 148a to 148b.

The second force F2 is a force that causes the brake rollers 115 to bite into the feed rollers 114, which is generated by a load (separation torque) applied to the brake rollers 115 that tries to rotate in the direction A3 opposite to the medium feed direction in the medium feed direction A1. The second force F2 is applied in a direction in which the brake rollers 115 press the feed rollers 114 and changes dynamically in accordance with the maximum torque applied to the brake roller 115. That is, the second force F2 when the second torque limiters 148a to 148b define the maximum torque applied to the brake rollers 115 is greater than the second force F2 when the first torque limiter 146 defines the maximum torque applied to the brake rollers 115.

The third force F3 is a force that tries to float the brake roller 115 upward, which is generated by the gear transmission torque of the gear group including the seventh to ninth gears 143g to 143i. The third force F3 is added in a direction in which the brake rollers 115 are apart from the feed rollers 114, and dynamically changes in accordance with the torques applied to the gear group including the seventh to ninth gears 143g to 143i. The medium conveying apparatus 100 uses a ratchet gear 147 located between the first torque limiter 146 and the second torque limiters 148a to 148b to change the torque limiter that defines the maximum torque applied to the brake rollers 115. The first limit value of the first torque limiter 146 is smaller than the second limit value of the second torque limiters 148a to 148b. Therefore, the maximum torque applied to the gear group including the seventh to ninth gears 143g to 143i is the first limit value, regardless of whether or not the force for rotating the brake rollers 115 in the medium feeding direction by the feed rollers 114 is interrupted by the ratchet gear 147. Therefore, the third force F3 does not change regardless of whether the torque limiter that defines the maximum torque applied to the brake rollers 115 is the first torque limiter 146 or the second torque limiters 148a to 148b.

A force of a magnitude acquired by subtracting the magnitude of the third force F3 from the sum of the magnitude of the first force F1 and the magnitude of the second force F2, is applied to the brake roller 115 in a direction in which the brake rollers 115 press the feed rollers 114. For example, it is possible to change the maximum torque applied to the brake rollers by providing two driving force transmission paths in which torque limiters having torque limit values different from each other are located between the gear group and the brake rollers, and switching the driving force transmission path. However, in that case, if the maximum torque applied to the brake rollers increases, the maximum torque applied to the gear group also increases, and the third force F3 generated in the direction in which the brake rollers are spaced apart from the feed rollers also increases. That is, in this case, the third force F3 is also increased together with the second force F2, the force acting in the direction in which the brake rollers 115 press the feed rollers 114 is not sufficiently large as a whole. Therefore, the maximum torque applied to the brake rollers 115 is too large relative to the pressing force for pressing the brake rollers 115 to the feed rollers 114 side. Thus, when only one medium is present between the brake rollers 115 and the feed rollers 114, the brake rollers 115 are less likely to be driven by the feed rollers 114, and thus slipping of the medium is likely to occur.

On the other hand, in the medium conveying apparatus 100, even when the maximum torques applied to the brake rollers 115 are changed, the third force F3 does not change since the maximum torques applied to the gear group including the seventh to ninth gears 143g to 143i do not change. Therefore, when increasing the maximum torque applied to the brake rollers 115, the pressing force for pressing the brake rollers 115 to the feed rollers 114 side also increases. Thus, since the brake rollers 115 and the feed rollers 114 interpose the medium with a sufficient force, it is suppressed that slip occurs between the brake rollers 115 and the medium. Accordingly, the medium conveying apparatus 100 limits the maximum torque applied to the brake rollers 115 to an appropriate size, relative to the pressing force for pressing the brake rollers 115 to the feed rollers 114 side, and suppresses that the slip of the medium is likely to occur.

Figure 10:
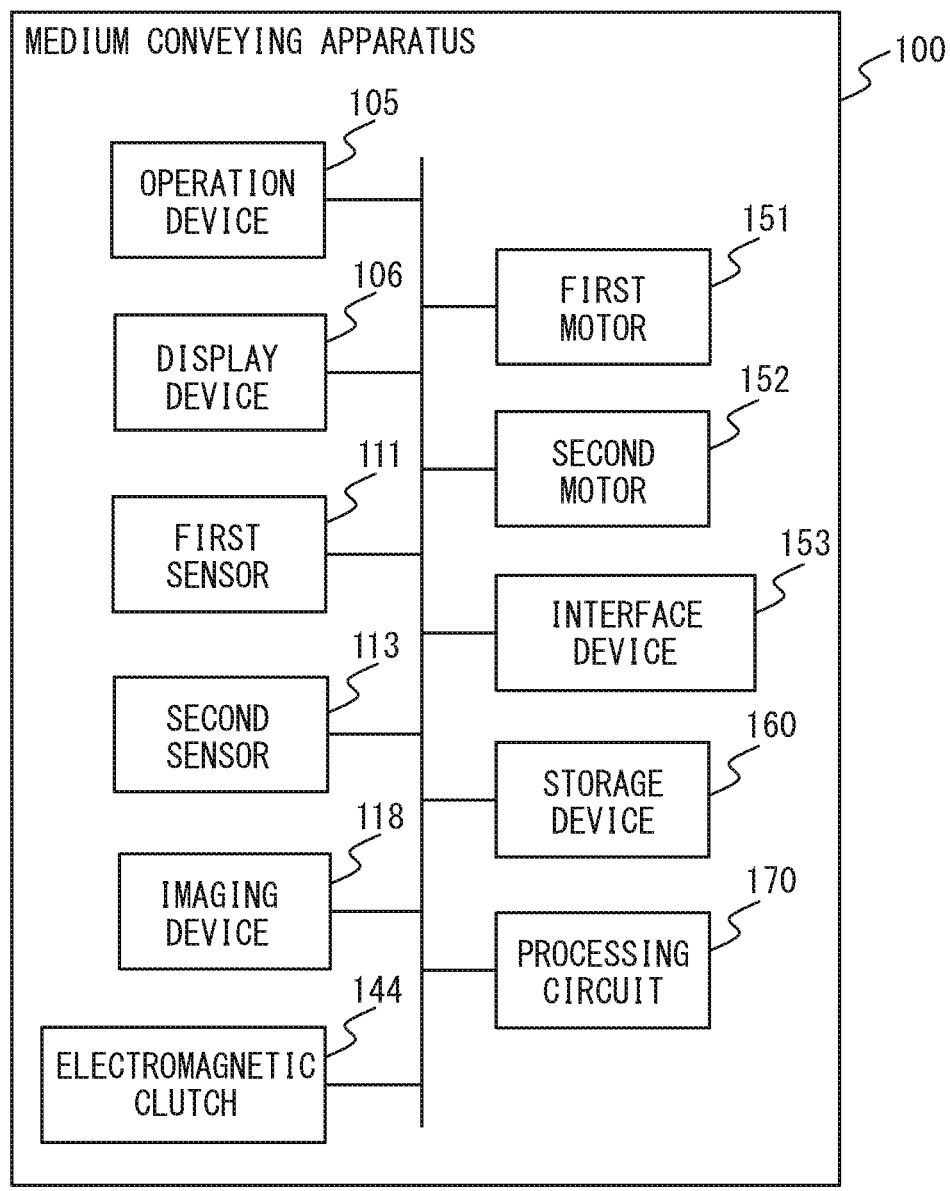
FIG. 10 is a block diagram illustrating a schematic configuration of the medium conveying apparatus 100.

FIG. 10 is a block diagram illustrating a schematic configuration of the medium conveying apparatus 100.

The medium conveying apparatus 100 further includes an interface device 153, a storage device 160, and a processing circuit 170, etc., in addition to the configuration described above.

For example, the interface device 153 includes an interface circuit conforming to a serial bus such as universal serial bus (USB), is electrically connected to an unillustrated information processing apparatus (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 153. For example, the predetermined communication protocol is a wireless local area network (LAN).

The storage device 160 includes a memory device such as a random access memory (RAM) or a read only memory (ROM), a fixed disk device such as a hard disk, or a portable storage device such as a flexible disk or an optical disk. Further, the storage device 160 stores a computer program, a database, a table, etc., used for various types of processing in the medium conveying apparatus 100. The computer program may be installed on the storage device 160 from a computer-readable, non-transitory medium such as a compact disc read only memory (CD-ROM), a digital versatile disc read only memory (DVD-ROM), etc., by using a well-known setup program, etc.

The processing circuit 170 operates in accordance with a program previously stored in the storage device 160. The processing circuit 170 is, for example, a CPU (Central Processing Unit). The processing circuit 170 may be a digital signal processor (DSP), a large scale integration (LSI), an application specific integrated circuit (ASIC), a field-programmable gate array (FPGA), etc.

The processing circuit 170 is connected to the operating device 105, the display device 106, the first sensor 111, the second sensor 113, the imaging device 118, the electromagnetic clutch 144, the first motor 151, the second motor 152, the interface device 153 and the storage device 160, etc., and controls each of these units. The processing circuit 170 performs drive control of the first motor 151 and the second motor 152, imaging control of the imaging device 118, etc., controls the conveyance of the medium, generates an input image, and transmits the input image to the information processing apparatus via the interface device 153.

Figure 11:
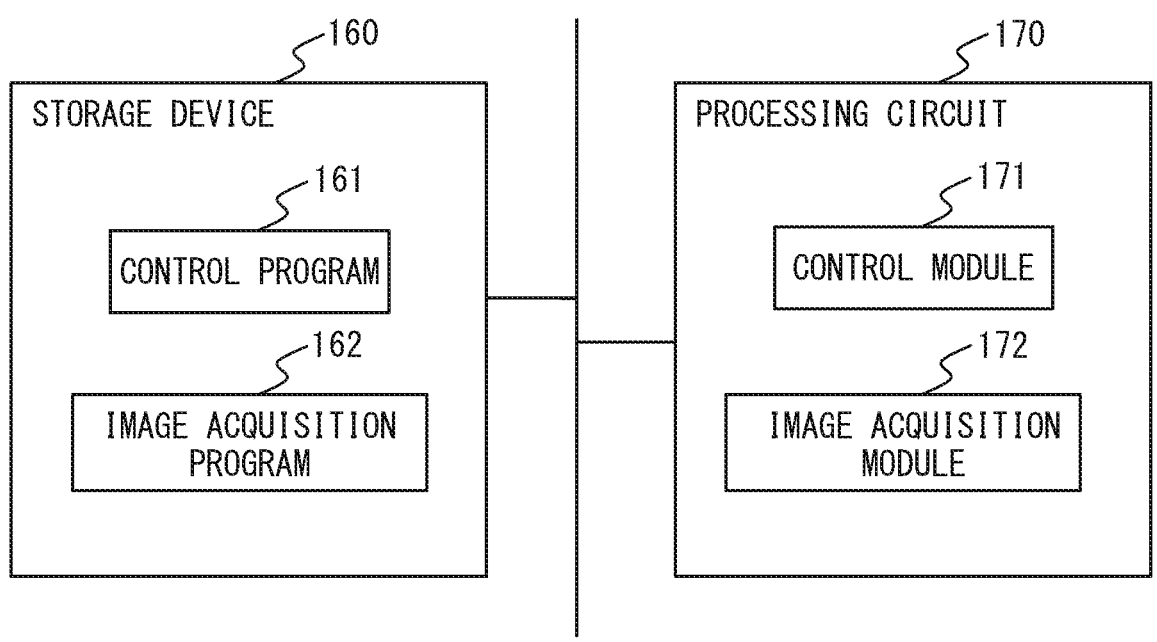
FIG. 11 is a diagram illustrating schematic configurations of the storage device 160 and the processing circuit 170.

FIG. 11 is a diagram illustrating schematic configurations of the storage device 160 and the processing circuit 170.

As illustrated in FIG. 11, a control program 161, an image acquisition program 162, etc., are stored in the storage device 160. Each of these programs is a functional module implemented by software operating on a processor. The processing circuit 170 reads each program stored in the storage device 160 and operates in accordance with each read program. Thus, the processing circuit 170 functions as a control module 171 and an image acquisition module 172.

Figure 12:
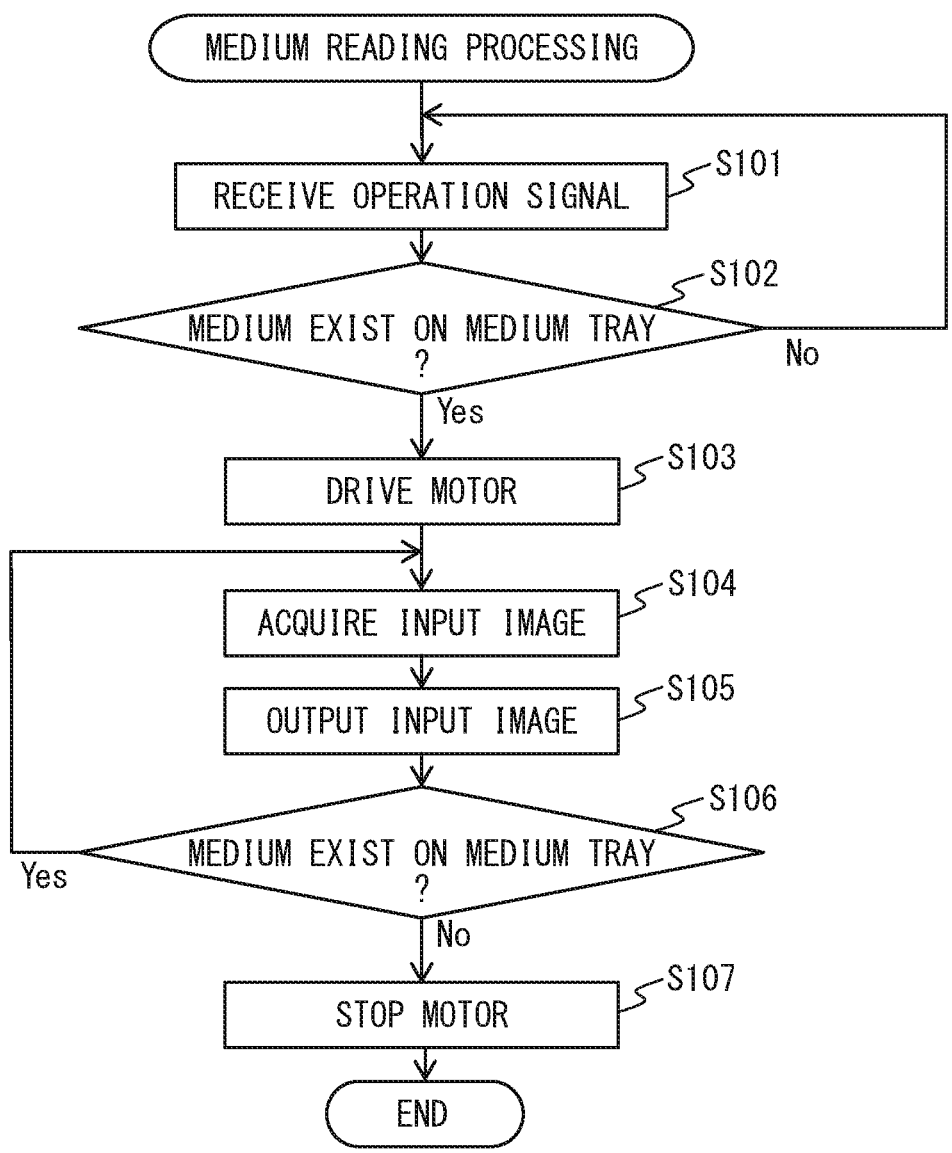
FIG. 12 is a flowchart illustrating an operation example of the medium reading processing.

FIG. 12 is a flowchart illustrating an operation example of medium reading processing in the medium conveying apparatus 100.

Referring to the flowchart illustrated in FIG. 12, an operation example of the medium reading processing in the medium conveying apparatus 100 will be described below. The operation flow described below is executed mainly by the processing circuit 170 in cooperation with each element in the medium conveying apparatus 100, in accordance with a program previously stored in the storage device 160. The operation flow illustrated in FIG. 12 is periodically executed.

First, the control module 171 stands by until an instruction to read a medium is input by a user by use of the operation device 105, and an operation signal instructing to read the medium is received from the operation device 105 (step S101).

Next, the control module 171 acquires the medium signal from the second sensor 113 and determines whether or not the medium is placed on the medium tray 103 based on the acquired medium signal (step S102).

When a medium is not placed on the medium tray 103, the control module 171 returns the processing to step S101 and stands by until newly receiving an operation signal from the operation device 105.

On the other hand, when a medium is placed on the medium tray 103, the control module 171 drives the first motor 151 and the second motor 152 (step S103). The control module 171 causes the first motor 151 to generate the first driving force to rotate the brake rollers 115 in the direction A3 opposite to the medium feeding direction, and causes the first to fourth conveyance rollers 116, 117, 119, and 120 to rotate in the medium conveying directions A4 to A7. Further, the control module 171 causes the second motor 152 to generate the second driving force to rotate the feed rollers 114 in the medium feeding direction A2. Thus, the control module 171 performs feeding and conveying of the medium. Further, the control module 171 drives a motor (not shown) to move the pick arm 112 downward, to urge the medium placed on the medium tray 103 from above.

Next, the image acquisition module 172 causes the imaging device 118 to start imaging of the medium, and acquires an input image from the imaging device 118 (step S104).

Next, the image acquisition module 172 transmits the input image to the information processing apparatus through the interface device 153 (step S105). When not being connected to the information processing apparatus, the image acquisition module 162 stores the input image in the storage device 160.

Next, the control module 171 determines whether or not the medium remains on the medium tray 103 based on the medium signal acquired from the second sensor 113 (step S106). When a medium remains on the medium tray 103, the control module 171 returns the processing to step S104 and repeats the processing in steps S104 to S106.

On the other hand, when the medium does not remain on the medium tray 103, the control module 171 stops the first motor 151 and the second motor 152 (step S107), and ends the series of steps.

As described in detail above, the medium conveying apparatus 100 changes the limit value of the torque of the torque limiter according to the height of the media placed on the medium tray 103. Thus, the medium conveying apparatus 100 can suppress the occurrence of a medium jam when a thin paper, etc., is conveyed as a medium while suppressing the occurrence of multi-feed of the medium when the weight of the medium placed on the medium to be fed is large. Thus, the medium conveying apparatus 100 can more appropriately feed the medium.

Further, in the medium conveying apparatus 100, when the torque limiter is changed, the torque limiter is provided so that the force in the direction in which the brake rollers 115 are spaced apart from the feed rollers 114 does not change while the force in the direction in which the brake rollers 115 press the feed rollers 114 is changed. Thus, the medium conveying apparatus 100 can suppress that the slip of the medium by the large maximum torque applied to the brake rollers 115 relative to the pressing force for pressing the brake rollers 115 to the feed rollers 114 side, is likely to occur. Thus, the medium conveying apparatus 100 can more appropriately feed the medium.

The medium conveying apparatus 100 also uses the mechanical first torque limiter 146 and second torque limiters 148a to 148b to change the maximum torque applied to the brake rollers 115. Thus, the medium conveying apparatus 100 can change the maximum torque applied to the brake rollers 115 without the use of expensive components such as an electromagnetic clutch or electromagnetic brake, thereby reduce the device cost.

Figure 13:
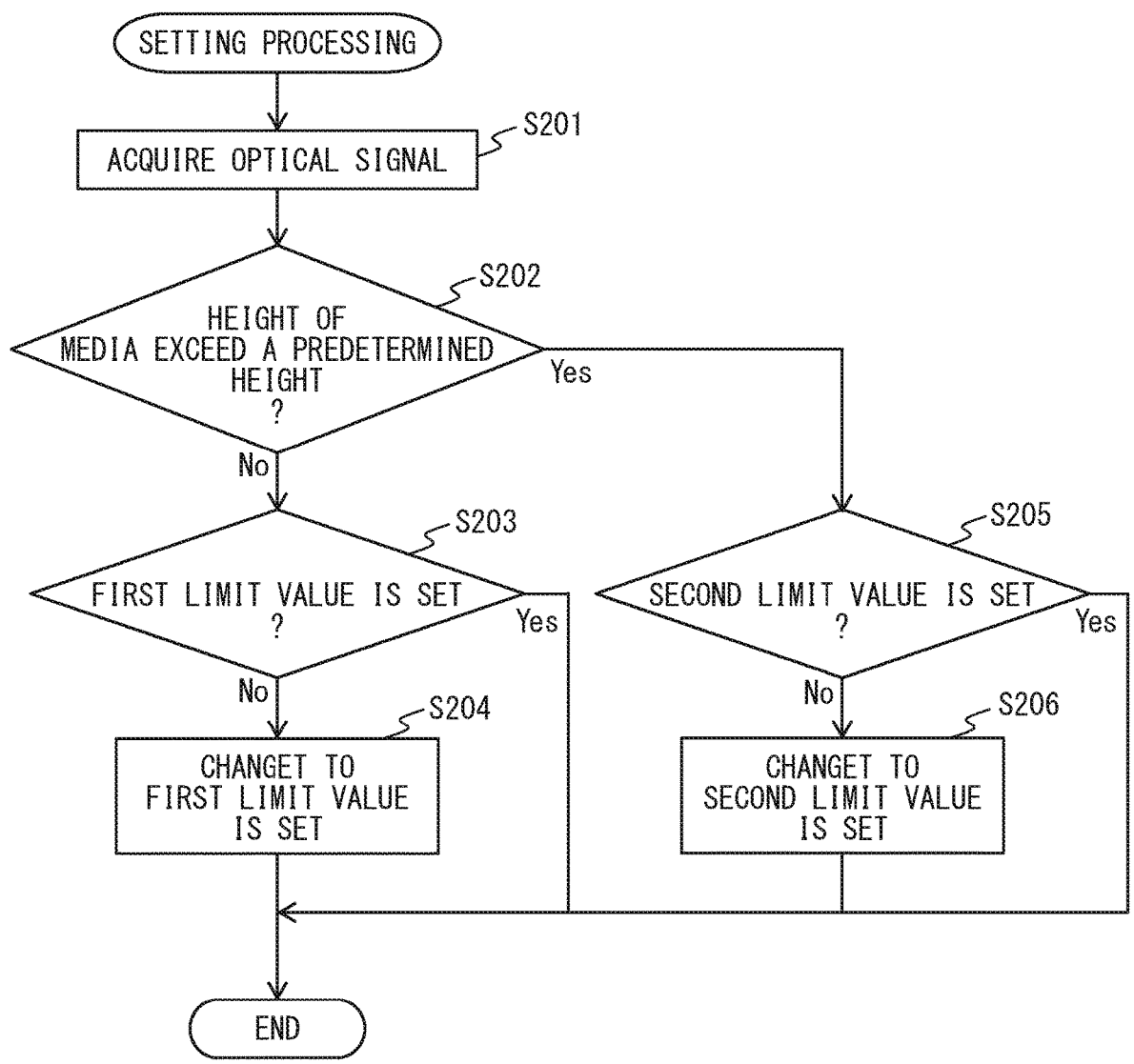
FIG. 13 is a flowchart illustrating an operation example of the setting processing.

FIG. 13 is a flowchart illustrating an example of an operation of a setting process of a medium conveying apparatus according to another embodiment.

Referring to the flowchart illustrated in FIG. 13, an operation example of the setting processing in the medium conveying apparatus 100 will be described below. The operation flow described below is executed mainly by the processing circuit 170 in cooperation with each element in the medium conveying apparatus, in accordance with a program previously stored in the storage device 160. The operation flow illustrated in FIG. 13 is periodically executed.

In the present embodiment, in the medium conveying apparatus, the abutting portion 112b of the pick arm 112, the stopper 132, the first torque limiter 146, the ratchet gear 147 and the second torque limiter 148a to 148b are omitted. In the present embodiment, the electromagnetic clutch 144 functions as a torque limiter of the torque applied to the brake rollers 115 and defines a maximum torque applied to the brake rollers 115. Before the flow of the operation shown in FIG. 13 is executed, the limit value of the torque of the electromagnetic clutch 144 is set to an initial value within the first limit value or the second limit value.

First, the control module 171 acquires an optical signal from the first sensor 111, and detects the height of the media placed on the medium tray 103, based on the acquired optical signal (step S201). A table showing the relationship between the signal value of the optical signal and the height of the media placed on the medium tray 103 is stored in advance in the storage device 160, based on a prior experiment of acquiring an optical signal while changing the height of the media placed on the medium tray 103. The control module 171 specifies the height of the media placed on the medium tray 103 based on the table stored in the storage device 160.

Next, the control module 171 determines whether the height of the media exceeds a predetermined height (step S202). The predetermined height is, for example, set to the minimum value of the height of the media at which multi-feed of the medium occurred in a prior experiment in which the medium is conveyed while changing the height of the media placed on the medium tray 103 with the maximum torque applied to the brake rollers 115 set to the first limit value.

When the height of the media is equal to or less than the predetermined height, the control module 171 determines whether or not the limit value of the torque of the electromagnetic clutch 144 is set to the first limit value (step S203). When the limit value of the torque of the electromagnetic clutch 144 is set to the first limit value, the control module 171 terminates a series of steps without executing the processing in particular. On the other hand, when the limit value of the torque of the electromagnetic clutch 144 is not set to the first limit value, the control module 171 changes the limit value of the torque of the electromagnetic clutch 144 by setting the limit value to the first limit value (step S204), and ends the series of steps.

On the other hand, when the height of the media exceeds the predetermined height, the control module 171 determines whether or not the limit value of the torque of the electromagnetic clutch 144 is set to the second limit value (step S205). When the limit value of the torque of the electromagnetic clutch 144 is set to the second limit value, the control module 171 terminates a series of steps without executing the processing in particular. On the other hand, when the limit value of the torque of the electromagnetic clutch 144 is not set to the second limit value, the control module 171 changes the limit value of the torque of the electromagnetic clutch 144 by setting the limit value to the second limit value (step S206), and ends the series of steps.

Thus, in the present embodiment, the control module 171 functions as a changing module to change the limit value of the torque limiter according to the height of the media placed on the medium tray 103. Thus, the medium conveying apparatus 100 can change the limit value of the torque applied to the brake rollers 115 without using a plurality of torque limiters, thereby, the structure of the apparatus can be simplified, and the apparatus size and the apparatus weight can be reduced.

The control module 171 may change the limit value of the torque in any stage of three or more stages instead of changing the limit value in two stages of the first limit value and the second limit value. In that case, the control module 171 changes the limit value so that the higher the height of the media placed on the medium tray 103 is, the larger the limit value. Thus, the medium conveying apparatus 100 can more flexibly change the limit value of the torque applied to the brake rollers 115.

An electromagnetic brake may also be used in place of the electromagnetic clutch 144. The electromagnetic brake is a brake capable of electromagnetically changing the limit value of the torque in accordance with a control signal from the processing circuit 170, and transmits a driving force from the first motor 151 to the brake roller 115. The electromagnetic brake is, for example, a micro powder brake. The electromagnetic brake may be another type of brake, such as a hysteresis brake.

In addition, the control module 171 may detect the height of the media placed on the medium tray 103 by using a third sensor for detecting the height at which the rollers 112a (pick arm 112) is located, instead of the first sensor 111. In this case, the pick arm 112 is provided with a shield portion that moves in conjunction with the movement of the rollers 112a. The third sensor has a light emitter and the light receiver provided so as to face each other across the shielding portion located in a predetermined position. The light emitter emits light toward light receiver. The light receiver receives the light emitted by the light emitter, and outputs a second optical signal which is an electrical signal corresponding to the intensity of the received light. When there is a shielding portion between the light emitter and the light receiver, the light emitted by the light emitter is shielded by the shielding portion. Therefore, the signal value of the second optical signal changes according to the position of the shielding portion, that is, according to the height at which the rollers 112a of the pick arm 112 are located (the height of the media). The control module 171 acquires the second optical signal from the third sensor, and detects the height of the media placed on the medium tray 103, based on the acquired second optical signal.

As described in detail above, the medium conveying apparatus can more appropriately feed the medium even when using the electromagnetic clutch 144 or the electromagnetic brake.

Figure 14:
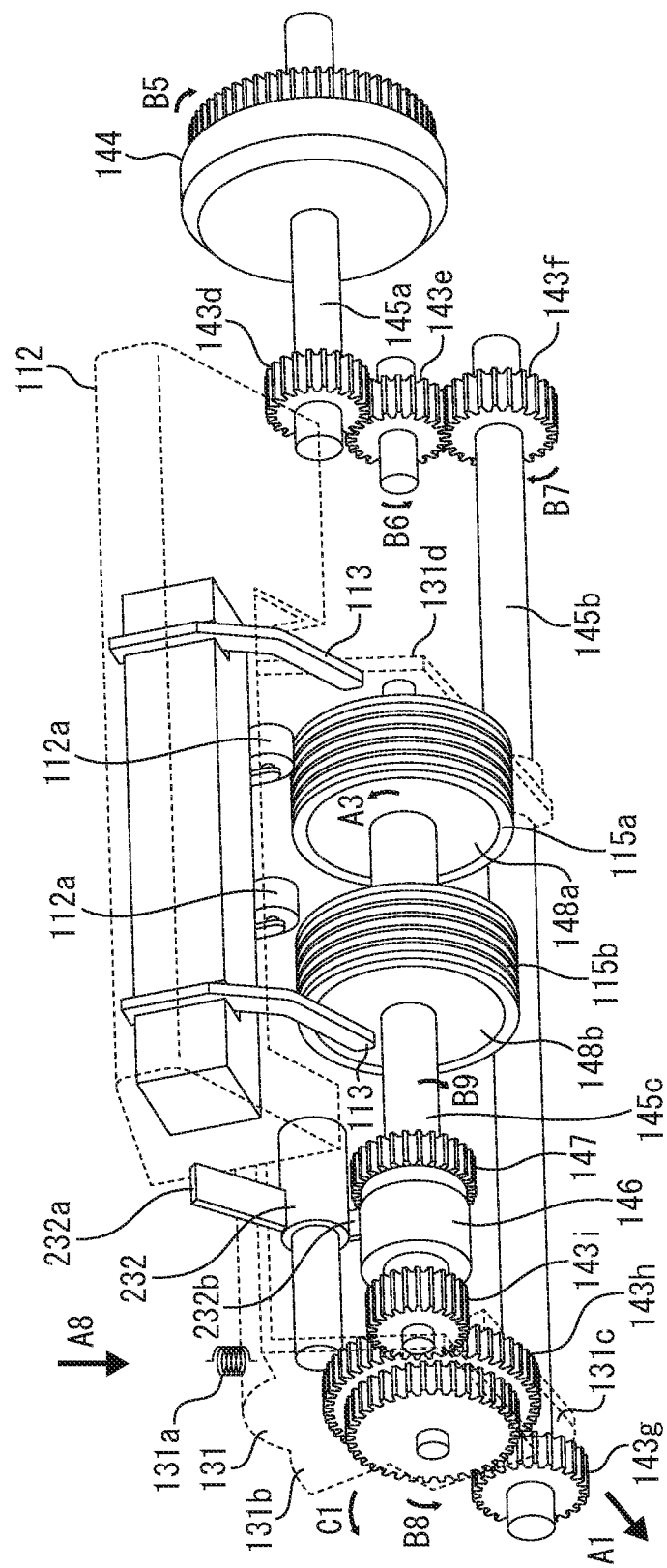
FIG. 14 is a schematic diagram for illustrating another stopper 232.

FIG. 14 is a schematic diagram for explaining a stopper 232 of a medium conveying apparatus according to still another embodiment. FIG. 14 is a perspective view of the stopper 232 from the upstream side. The stopper 232 is used in place of the stopper 132 of the medium conveying apparatus 100. In the present embodiment, the abutting portion 112b of the pick an 112 is omitted in the medium conveying apparatus.

The stopper 232 is rotatably (swingably) supported with the support member 131. The stopper 132 has a grip portion 232a and a locking portion 232b.

The grip portion 232a is provided so as to rotate and move about the rotation axis of the stopper 232 in response to an operation by the user.

The locking portion 232b is provided at a position facing the ratchet gear 147, and is provided so as to rotate in conjunction with the rotational movement of the grip portion 232a.

Figure 15:
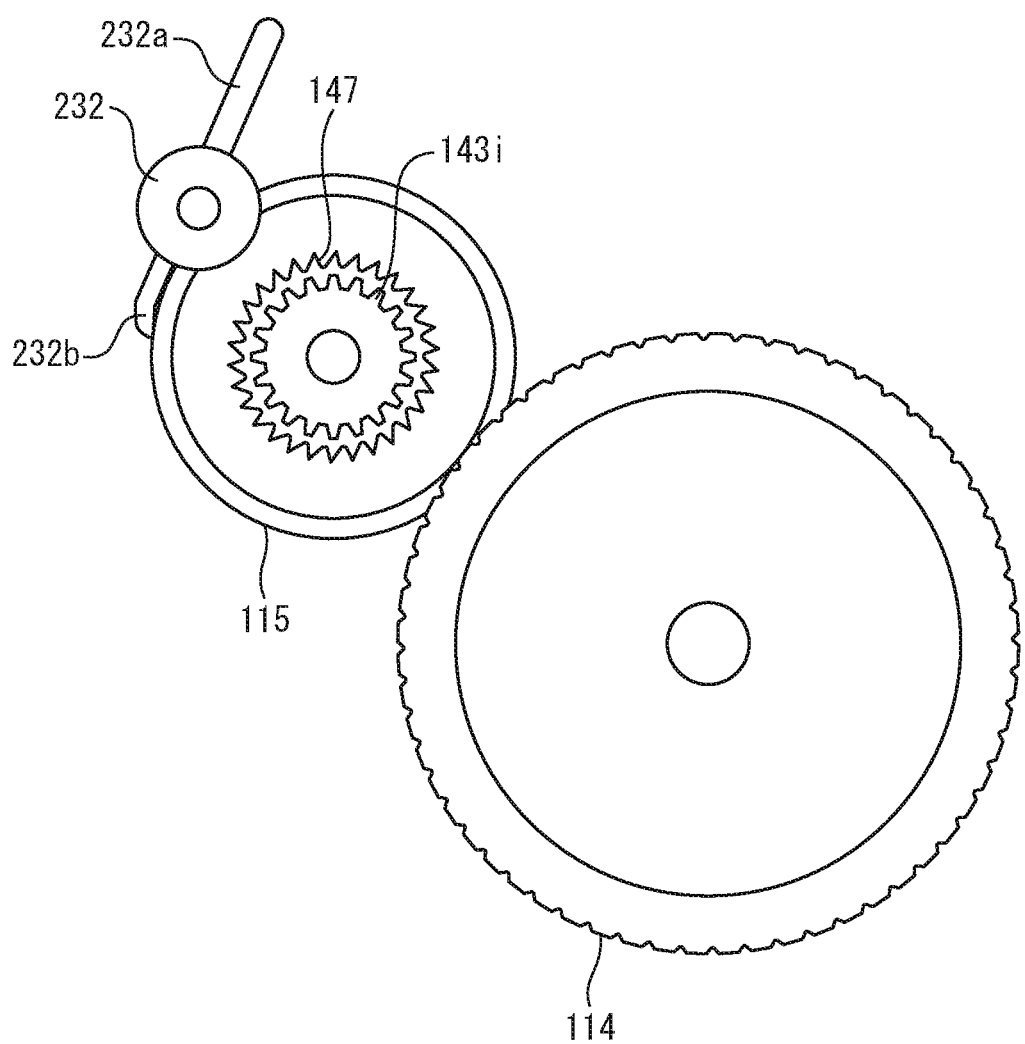
FIG. 15 is a schematic diagram for illustrating the operations of the stopper 232, etc.
Figure 16:
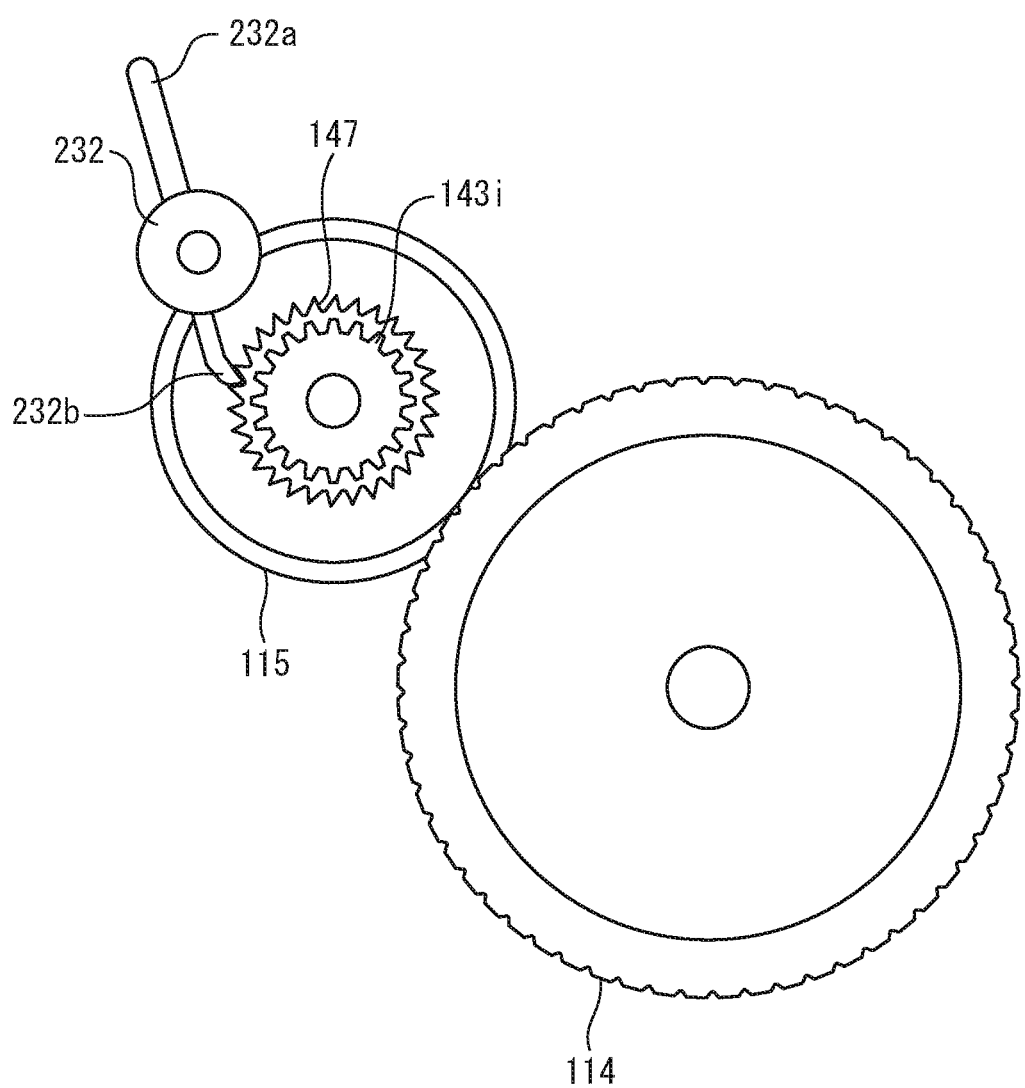
FIG. 16 is a schematic diagram for illustrating the operations of the stopper 232, etc.

FIGS. 15 and 16 are schematic views for illustrating the operations of the stopper 232 and the brake rollers 115.

As shown in FIG. 15, when the grip portion 232a is located at the first predetermined position in response to the operation by the user, the locking portion 232b is separated from the ratchet gear 147, and the rotation of the ratchet gear 147 is not limited. In this case, the torque limiter that defines the maximum torque applied to the brake rollers 115 is set to the first torque limiter 146. On the other hand, as shown in FIG. 16, when the grip portion 232a is located at a second predetermined position different from the first predetermined position in response to the operation by the user, the locking portion 132b abuts against the ratchet gear 147 to lock the ratchet gear 147. The ratchet gear 147 locked by the locking portion 132b is rotatable only in the direction A3 opposite to the medium feeding direction, and cannot rotate in the medium feeding direction (the direction opposite to the arrow A3). In this case, the torque limiter that defines the maximum torque applied to the brake rollers 115 are set to the second torque limiters 148a and 148b.

That is, in the present embodiment, the grip portion 232a functions as a setting member to set the torque limiter that defines the maximum torque applied to the brake roller 115 to either the first torque limiter 146 or the second torque limiter 148a to 148b in response to the operation by the user. The medium conveying apparatus can more flexibly set the limit value of the torque applied to the brake rollers 115 in response to the operation by the user.

As described in detail above, the medium conveying apparatus can more appropriately feed the medium even when the limit value of the torque applied to the brake rollers 115 is set in response to the operation by the user.

Figure 17:
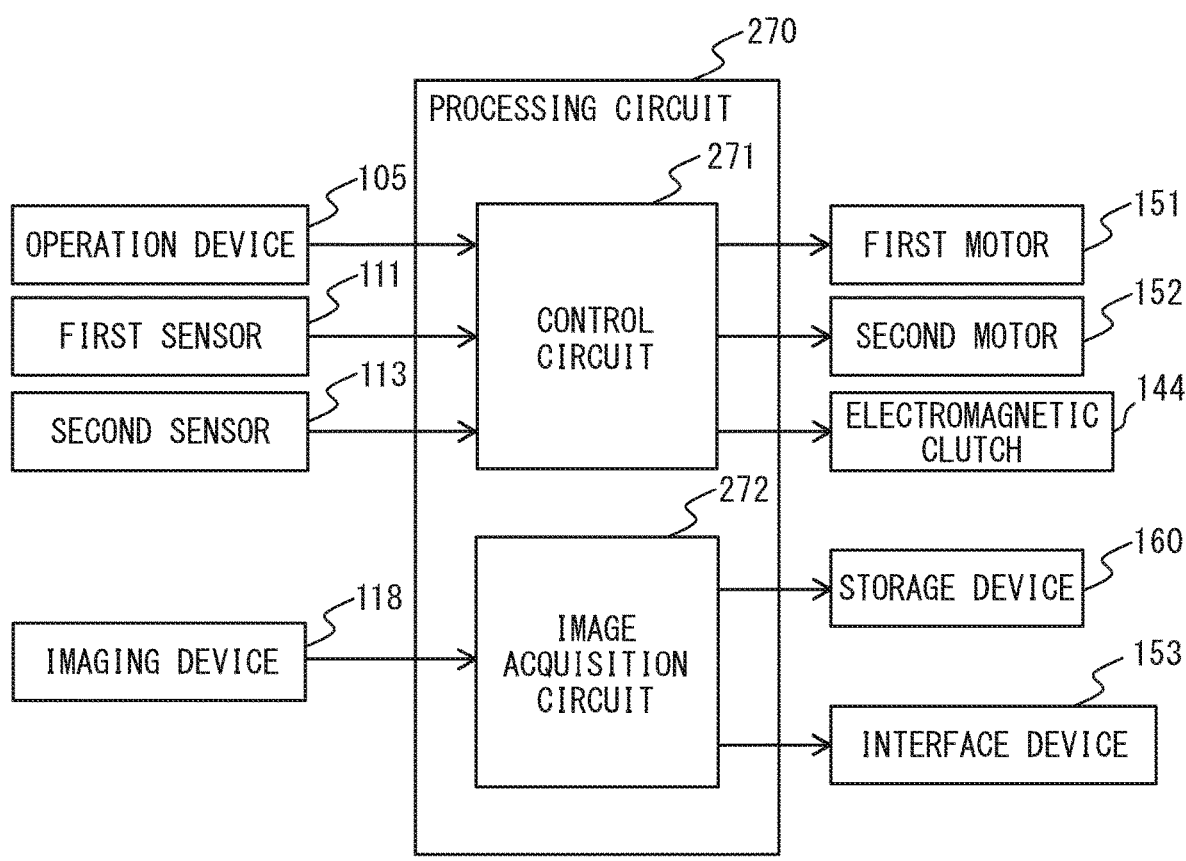
FIG. 17 is a diagram illustrating a schematic configuration of yet another processing circuit 270.

FIG. 17 is a diagram illustrating a schematic configuration of a processing circuit 270 in a medium conveying apparatus according to yet another embodiment. The processing circuit 270 is used in place of the processing circuit 170 in the medium conveying apparatus 100 and executes the medium reading processing and the setting processing in place of the processing circuit 170. Processing circuit 270 includes a control circuit 271 and an image acquisition circuit 272, etc. Note that each unit may be configured by an independent integrated circuit, a microprocessor, firmware, etc.

The control circuit 271 is an example of a control module and has a function similar to the control module 171. The control circuit 271 receives the operation signal from the operating device 105, the optical signal from the first sensor 111, and the medium signal from the second sensor 113. The control circuit 271 drives the first motor 151 and the second motor 152 in accordance with the received signals, and sets the limit value of the torque of the electromagnetic clutch 144.

The image acquisition circuit 272 is an example of an image acquisition module and has a function similar to the image acquisition module 172. The image acquisition circuit 272 receives the input image from the imaging device 118 and stores the input image into the storage device 160, and also transmits the input image to the information processing apparatus through the interface device 153.

As described in detail above, the medium conveying apparatus can more appropriately feed the medium even when the processing circuit 270 is used.

In accordance with embodiments, the media conveying apparatus, the method, and the computer-readable non-temporary medium storing the control program, can more appropriately feed the medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
   a medium tray;
   a feed roller to feed media placed on the medium tray in order from a lower side of the media;
   a brake roller located to face the feed roller;
   a torque limiter to control a load applied to the brake roller; and
   a changing member including a contact portion to contact a medium placed on the medium tray to urge the media placed on the medium tray from above, wherein the contact portion is entirely located at a position on an upstream side of a nip portion of the feed roller and the brake roller in a medium conveying direction, and change a limit value of a torque of the torque limiter according to a height at which the contact portion is located at the position on the upstream side of the nip portion in the medium conveying direction.

2. The medium conveying apparatus according to claim 1, wherein
   the torque limiter includes a first torque limiter of which the limit value of the torque is a first limit value, and a second torque limiter of which the limit value of the torque is a second limit value greater than the first limit value, and wherein
   the changing member changes the limit value of the torque of the torque limiter to the first limit value or the second limit value according to a height of the media placed on the medium tray.

3. The medium conveying apparatus according to claim 2, further comprising a motor to generate a driving force for rotating the brake roller in a direction opposite to a medium feed direction, wherein
   the second torque limiter is located on a transmission path of the driving force from the first torque limiter to the brake roller, wherein
   the medium conveying apparatus further comprise a regulating member to prevent a force for rotating the brake roller by the feed roller in the medium feed direction from being transmitted to the first torque limiter, and wherein
   the changing member changes the limit value of the torque of the torque limiter to the first limit value or the second limit value by changing whether a force for rotating the brake roller by the feed roller in the medium feeding direction is transmitted to the first torque limiter by using the regulating member.

4. A method for controlling conveying a medium, the method comprising:
   feeding media placed on a medium tray in order from a lower side of the media, by a feed roller;
   controlling a load applied to a brake roller located to face the feed roller by a torque limiter; and
   changing a limit value of a torque of the torque limiter according to a height at which a contact portion to contact a medium placed on the medium tray of a changing member to urge the media placed on the medium tray from above is located at a position on an upstream side of a nip portion of the feed roller and the brake roller in a medium conveying direction, wherein the contact portion is entirely located at the position on the upstream side of the nip portion in the medium conveying direction.

5. The method according to claim 4, wherein
   the torque limiter includes a first torque limiter of which the limit value of the torque is a first limit value, and a second torque limiter of which the limit value of the torque is a second limit value greater than the first limit value, and wherein
   the limit value of the torque of the torque limiter is changed to the first limit value or the second limit value according to a height of the media placed on the medium tray.

6. The method according to claim 5,
   further comprising generating a driving force for rotating the brake roller in a direction opposite to a medium feed direction by a motor, wherein
   the second torque limiter is located on a transmission path of the driving force from the first torque limiter to the brake roller,
   further comprising preventing a force for rotating the brake roller by the feed roller in the medium feed direction from being transmitted to the first torque limiter by a regulating member, wherein
   the limit value of the torque of the torque limiter is changed to the first limit value or the second limit value by changing whether a force for rotating the brake roller by the feed roller in the medium feeding direction is transmitted to the first torque limiter by using the regulating member.

\* \* \* \* \*